United States Patent [19]
Misawa

[11] Patent Number: 5,010,357
[45] Date of Patent: Apr. 23, 1991

[54] CAMERA IMAGE PLANE SIZE CONTROL DEVICE

[75] Inventor: Masayuki Misawa, Tokyo, Japan

[73] Assignee: Asahi Kogaku Kogyo Kabushiki Kaisha, Tokyo, Japan

[21] Appl. No.: 382,109

[22] Filed: Jul. 19, 1989

Related U.S. Application Data

[62] Division of Ser. No. 188,410, filed as PCT JP87/00649 on Sep. 1, 1987, published as W088/01754 on Mar. 10, 1988, Pat. No. 4,987,436.

[30] Foreign Application Priority Data

| Sep. 2, 1986 | [JP] | Japan | 61-134573 |
| Sep. 25, 1986 | [JP] | Japan | 61-146871 |
| Oct. 27, 1986 | [JP] | Japan | 61-164390 |
| Oct. 27, 1986 | [JP] | Japan | 61-164391 |
| Oct. 27, 1986 | [JP] | Japan | 61-164392 |

[51] Int. Cl.⁵ .................... G03B 13/32; G03B 1/18; G03B 17/00
[52] U.S. Cl. .................... 354/159; 354/173.1; 354/195.1; 354/203
[58] Field of Search ........... 354/159, 195.1, 195.12, 354/171, 173.1, 214, 203; 352/79

[56] References Cited

U.S. PATENT DOCUMENTS

| 4,149,790 | 4/1979 | Smith | 354/125 |
| 4,165,163 | 8/1979 | Lemanski | 354/122 |
| 4,180,314 | 12/1979 | Koch et al. | 354/159 |

FOREIGN PATENT DOCUMENTS

| 246188 | 3/1960 | Australia. |
| 239020 | 9/1945 | Switzerland. |
| 447347 | 5/1936 | United Kingdom. |
| 528851 | 11/1940 | United Kingdom. |
| 847990 | 12/1960 | United Kingdom. |
| 859126 | 1/1961 | United Kingdom. |
| 2083636A | 3/1982 | United Kingdom. |
| 2171528A | 2/1986 | United Kingdom. |

Primary Examiner—A. A. Mathews
Attorney, Agent, or Firm—Sandler, Greenblum & Bernstein

[57] ABSTRACT

Apparatus is provided for controlling the size of the image plane in a camera having a zoom lens. The apparatus includes one or more aperture frames (31, 32, 120) which define the image plane size, and an actuator which is adapted to move the aperture frame or frames along the film plane in accordance with the optical position of the exit pupil of a zoom lens. Two frames can be moved in opposite directions over an equal displacement. Further, a single frame (120) can be moved along the optical lens axis in order to ensure that the film remains substantially flat during photography, and is moved away from the film path during film winding and unwinding operations. Additionally, the frame can be provided with projecting portions along opposite side edges of a central aperture in order to control the image plane size.

66 Claims, 16 Drawing Sheets

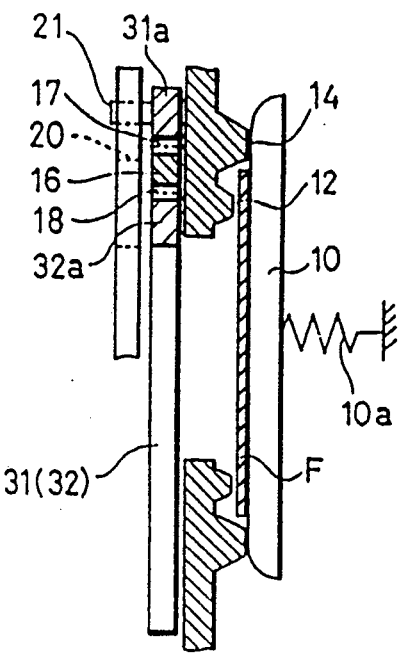
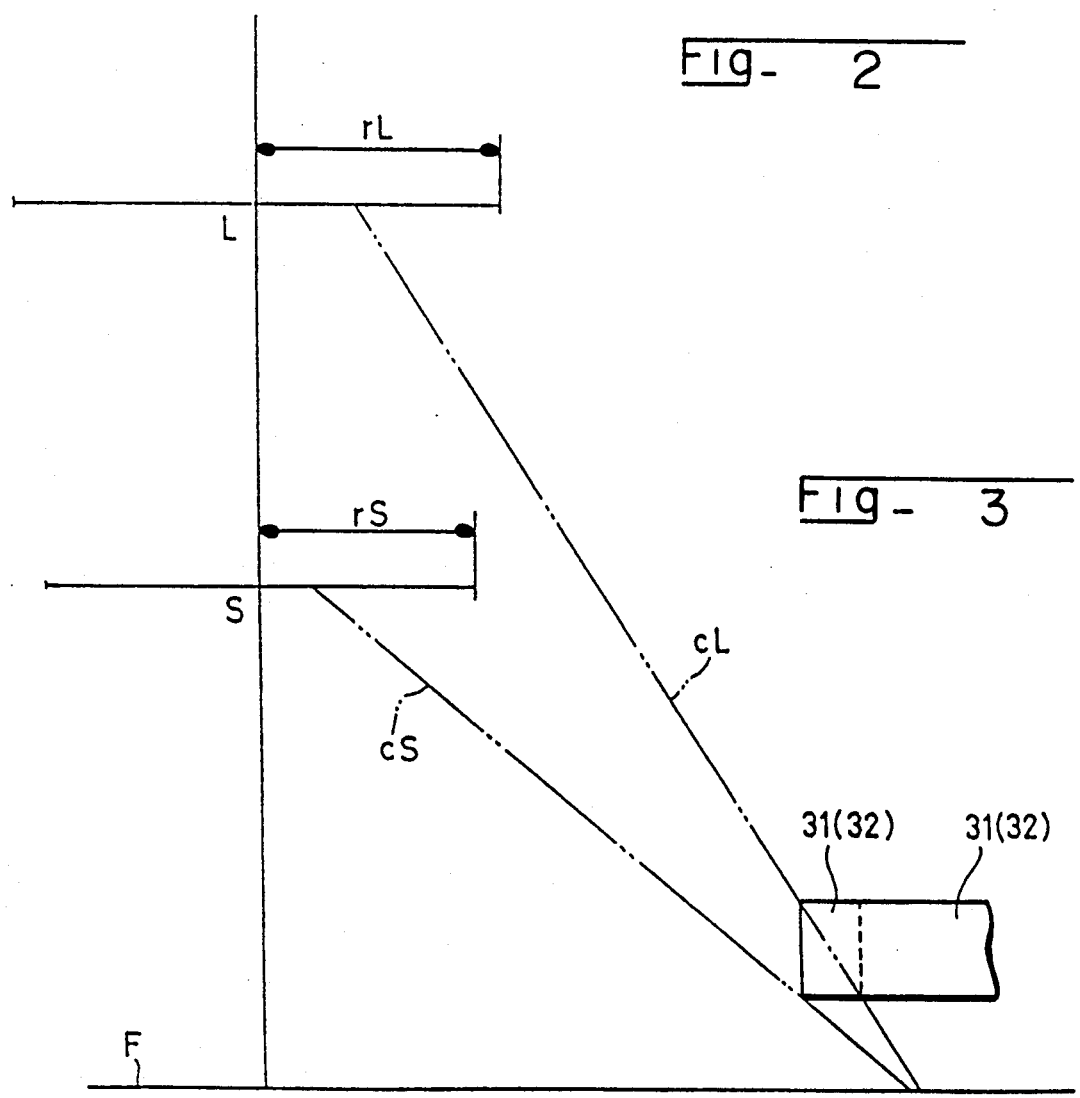
Fig. 2
Fig. 3

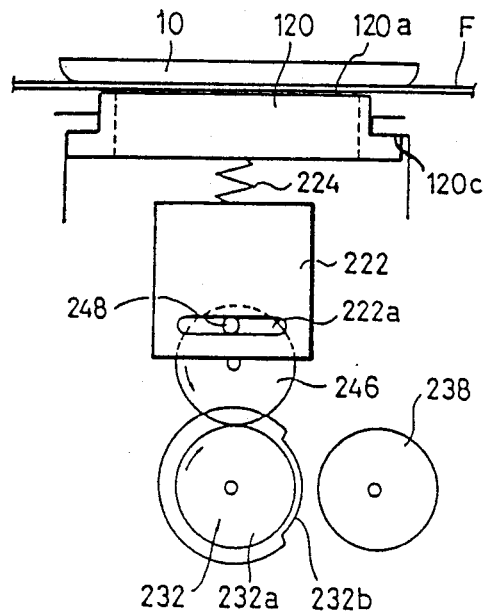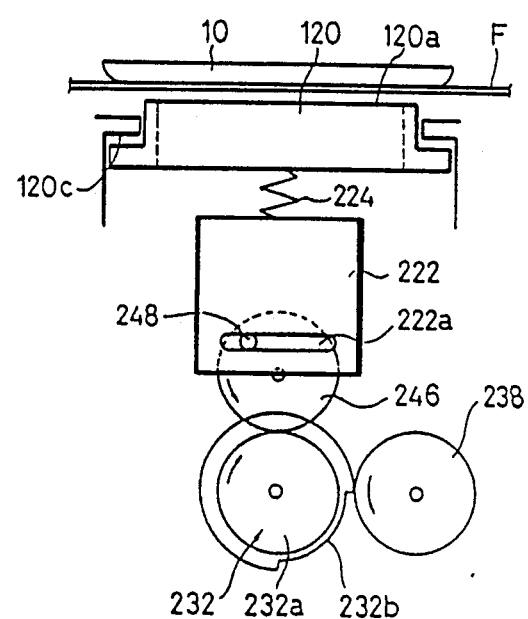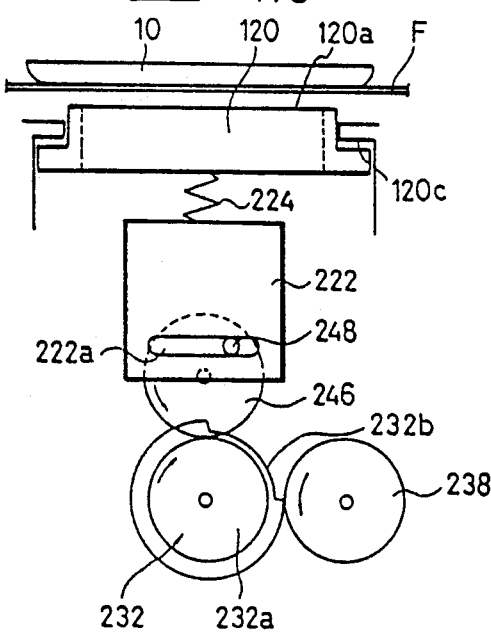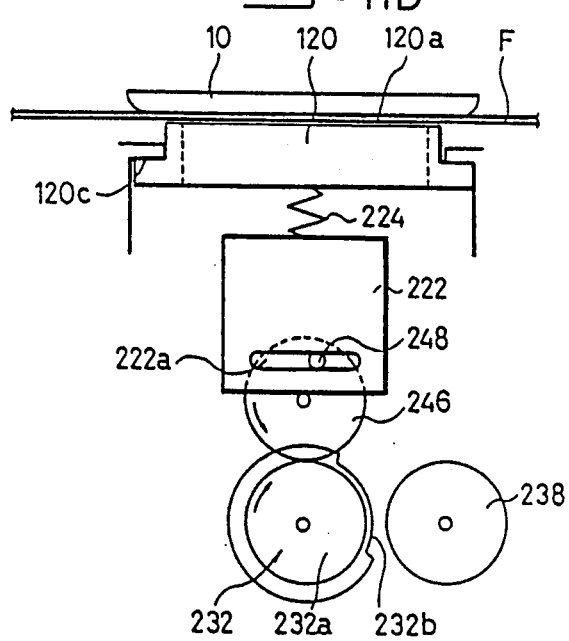

CAMERA IMAGE PLANE SIZE CONTROL DEVICE

This is a division of application Ser. No. 188,410 filed as PCT JP87/00649 on Sept. 1, 1987, published as WO88/01754 on Mar. 10, 1988 U.S. Pat. No. 4,987,436.

1. Technical Field

The present invention generally relates to apparatus for controlling the size of the image plane in a camera, and more specifically to apparatus for controlling the size of an image plane in a camera which includes a zoom lens. The present invention further relates to an apparatus for controlling the size of the image plane in a camera, which image plane size is restricted by an aperture.

2. Background Art

Generally, the size of an image plane in a camera is standardized in accordance with a predetermined standard, e.g., ISO or JIS (i.e., the Japanese Industrial Standard). The largest size of an image plane for 35 mm film is as follows 24.8 mm−24.0 mm X (i.e., by) 36.8 mm−36.0 mm. The size of the image plane is restricted by the fixed aperture in conventional cameras. Such fixed apertures, which cannot be varied, have not been disadvantageous in present cameras, even those having a zoom lens. This is due to the fact that lens systems including a zoom lens are designed such that the size of the image plane cannot be influenced by the exit pupil, even where the exit pupil most closely approaches the image plane. In conventional cameras, the size of the image plane is restricted in the vertical direction by upper and lower inner rails which virtually come into contact with upper and lower edges of the film; and, in the lateral or horizontal direction, by an aperture formed in an aperture defining or restricting plane which lies in front of the inner rails.

The aperture defining plane is positioned in front of the inner rails in order to minimize damage which would otherwise be caused to the film by virtue of contact between the film and the inner rails. The distance between the aperture defining plane and the inner rails is generally about 0.5 mm. Such type of film plane size restriction mechanism is not disadvantageous in conventional cameras, e.g., even those having zoom lens systems, and therefore is capable of satisfying requirements such as the JIS.

However, it has been found that the size of the image plane can be larger than the standard in a zoom lens developed by the present applicant. This zoom lens has an exit pupil which very closely approaches the film plane at one extreme focal length, so that one or more rays of light will defract outwardly through the aperture. The aperture is restricted along its vertical extent by inner rails which come into contact with the film, and in a lateral direction by frames which have aperture defining surfaces spaced from the film plane, and which serve to define the aperture. Accordingly, because of the separation or spacing of the aperture defining surfaces from the film plane, enlargement of the image plane will occur in the lateral direction.

FIG. 17 illustrates the enlargement of the image plane in the lateral direction. In FIG. 17, Q represents the aperture defining surface, R represents the aperture formed in the aperture defining surface Q, and F represents the film plane. The actual image plane size of an image formed on film plane F, when exit pupil E is located at position L, and the actual image plane size of an image formed on film plane F when exit pupil E is moved to a position S closer to film plane F than position L, are defined by rays of light (a) and (b), respectively. As seen in FIG. 17, the actual size of the image plane is larger than the maximum standard size 36.8 mm when exit pupil E is in a position S which is closer to film plane F. There is a tendency for the exit pupil to more closely approach film plane F when the zoom lens increases magnification and when the size of the lens system is minimized. Conventional fixed apertures cannot solve this problem of enlargement of the actual image plane which arises when the exit pupil so closely approaches the film plane.

The film and, accordingly, film plane F, move within a tunnel-like space defined by and between a pressure plate 10, which ensures that the film plane will be flat, and inner rails 12, which restrict/abut the upper and lower edges of film plate F, as shown in FIG. 18. In FIG. 18, outer rails 14 are provided which restrict the position of pressure plate 10, which plate is pressed against the film via spring 10a. As seen and understood in FIG. 18, the vertical right hand and left hand edges of film plane F are not subjected to a force which cause the film to be pressed against pressure plate 10. Thus, any pressing force applied to the right and left hand side edges of film plane F is small, so that only the right and left edges themselves of the film plane are prevented from separating from pressure plate 10.

FIG. 19 is a similar (albeit enlarged) representation of an image plane in the lateral direction. As shown in FIG. 19, an aperture defining plane 16′ is illustrated having an aperture 17′. Film plane F′ is also shown with respect to the position of aperture defining plane 16′. Assuming that the complete image plane area receives 100% of the rays of light which pass the lens system of the camera and reach the film plane F′, and that the incomplete image plane area receives only part of the rays of light which pass through the lens system and which reach the film plane F′, when exit pupil P′ is located at position A′; and, further, assuming that rays of light a′ define the complete image plane area and that rays of light b′ define the incomplete image plane area, the actual image plane size (i.e., the actual image plane area) can then be defined by rays of light which correspond to a bisector of light rays a′ and b′. The actual image plane size defined by rays of light c′ can then be larger than the standard, as noted above. This tendency, resulting from the rearward motion of exit pupil P′, i.e., towards film plane F′, increases as the zoom lens increases magnification and as the size of the lens system is minimized. Conventional image plane size restriction mechanisms are not capable of solving this problem of enlargement of the actual image plane.

One primary object of the present invention, therefore, is to provide an apparatus for controlling image plane size within a predetermined standard size even when using a zoom lens system in which an exit pupil will very closely approach the film plane.

In order to achieve the above-noted objects, in accordance with the present invention, the right-hand and left-hand peripheral edges of the aperture frame which define the aperture in the aperture defining plane located between the upper and lower inner rails will at least partially project or extend towards the inner rails.

Only the right and left-hand peripheral edges of the aperture frame need to project towards the inner rails, because the solution of the problem noted above lies in decreasing the distance between the aperture defining plane and the film plane, i.e., it will be necessary to displace the aperture defining plane towards the film plane. However, displacement of the entirety of the aperture defining plane towards the inner rails would decrease the passage area of film between the inner rails and the aperture defining plane, thereby resulting in an increase in the possibility of damage to the film plane. Accordingly, it has not been advisable, nor practicable, to move the entire aperture defining plane towards the inner rails. Under such circumstances, only a portion of the aperture defining plane, i.e., the aperture frame, projects towards the inner rails; and such structure alone is capable of restricting the actual image plane size within a predetermined standard or range.

DISCLOSURE OF INVENTION

In order to achieve the above and other objects, features and advantages of the present invention, an apparatus is provided for controlling the size of an image plane in a camera having a zoom lens in which an exit pupil moves in accordance with the zooming motion of a lens so that the size of the image plane will vary. One apparatus, elg., includes a pair of movable frames which restrict the right and left ends of an aperture to define the image plane size, and which extend in a lateral direction substantially parallel to the direction of movement of the film. The movable frames are operatively associated with the zooming operation of the zoom lens so that the movable frames moves in a lateral direction in accordance with the position of the exit pupil, in order to restrict the image plane size within predetermined values.

In accordance with another aspect of the present invention, an apparatus is provided for controlling the image plane size in a camera which comprises aperture frame(s) which define the image plane size and which are movable in directions along an optical axis of the imaging lens. This apparatus also includes actuating means for moving the aperture frame(s) to positions away from and approaching the film, which film moves along (and behind) the frame(s). This actuating means is operatively connected to a film winding and rewinding mechanism provided in the body of the camera. In this fashion, when a film winding operation is completed, the aperture frame(s) will closely approach the film and render it to be substantially flat by forming a relatively narrow tunnel-shaped space or gap through which the film can pass; and, during film winding and rewinding operations, the aperture frames will move away from the film to permit the film to move relatively more freely.

In accordance with still another aspect of the present invention, an apparatus is provided for controlling the image plane size in a camera having a camera body with an imaging lens. The apparatus includes aperture frame(s) which define the size of the image plane and which are movable in two directions along an optical axis of the imaging lens. The apparatus also includes means for biasing the aperture frame(s) to move towards film which is moving adjacent (and behind) the aperture frame(s), and electromagnetic actuating means for separating the aperture frames from the film, against the force exerted on the frame(s) by the biasing means, during the film winding and film rewinding operations.

In another aspect of the present invention, an apparatus for controlling the size of an image plane in a camera having a zoom lens is provided. The zoom lens comprises means for displacing an exit pupil of the lens in accordance with a zooming operation of said lens. The apparatus comprises first and second movable apertured frames together forming an aperture which comprises means for defining the size of said image plane, with the first and second movable aperture frames being movable in directions substantially parallel to the direction of movement of film which is travelling within said camera, said movable aperture frames being movable in response to the movement of the exit pupil during a zooming operation, said movable aperture frames thereby comprising means for restricting the size of said image plane within predetermined limits.

The present invention further provides apparatus for controlling the size of an image plane in a camera, wherein the camera has a body and an imaging lens therein. The apparatus comprises at least one aperture frame comprising means for defining the boundaries of said image plane, each said aperture frame being movable in a direction along the optical axis of said imaging lens, in which the apparatus further comprises actuating means for moving each of said aperture frame(s) towards and away from film positioned within said camera which moves along a path adjacent to, and behind, the extent of said aperture frames. The actuating means is operatively attached to a film winding and rewinding mechanism positioned within said camera body, thereby comprising means, when a film winding operation is completed, to move each aperture frame into a position in which the frame closely approaches (but preferably does not contact) said film and into a position in which the frame(s) is moved away from said film during film winding and rewinding operations, respectively.

In another aspect of the invention, apparatus is provided for controlling the image plane size in a camera which includes a body and an imaging lens therein. The apparatus comprises at least one aperture frame defining the size of said image plane, means for moving said at least one aperture frame in a direction along an optical axis of said imaging lens, with said apparatus further comprising means for biasing said at least one aperture frame into a position closely adjacent to film moving along a path adjacent to said aperture frame, and electromagnetic actuating means for spacing said at least one aperture frame into a position away from said film, against the force exerted by said biasing means during film winding and rewinding operations.

The present invention also provides apparatus for controlling the size of the image plane in a camera having an imaging lens, said apparatus comprising at least one aperture frame defining said image plane, each said aperture frame being movable in a direction along an optical axis of said imaging lens. Means are provided for biasing said at least one aperture frame away from film moving along a path adjacent to said at least one aperture frame. Actuating means are provided for moving said at least one aperture frame into a position closely adjacent to said film against the force exerted, by biasing means, and means are provided for limiting the movement of said at least one aperture frame towards said film; the actuating means and the restricting means are operatively connected, respectively, to a film winding and rewinding assembly in said camera, wherein when a film winding operation is completed, the aperture frames will be maintained in a position in which each said aperture frame is closely adjacent to said film, and wherein each of said aperture frames is moved away from said film during film winding and rewinding operations.

In a further aspect of the present invention, a camera is provided having a body which is adapted to receive film moving in a predetermined fashion along a path through said camera body, said camera comprising at least one movable aperture frame which comprises means for defining the size of an image plane on said film.

The camera can include, e.g., two aperture frames and means for moving said two frames in opposite directions in a direction substantially parallel to the direction of movement of film within said body; and the frames are positioned in front of said film when said film is in said camera. Each of said frames is substantially L-shaped, with each frame including a vertical portion and a substantially horizontal lateral plate portion attached thereto. Each lateral plate portion comprises a rack, with said racks facing each other in spaced relation; and a single common pinion engages both of said racks.

The lateral plate portion on one of said frames has a projection extending forwardly from said frame. The camera further comprises a generally L-shaped drive arm positioned in front of said frames, between a camera lens and said film path, wherein said arm is pivotably attached to said camera via a stationary shaft, said arm having an upper fork-shaped portion having a generally U-shaped recess adapted to engage a projection on one of said frames. A lower end of said drive arm includes a cam follower, wherein the cam follower is adapted to abut a camming surface on a rotatable zoom lens, said camming surface and said cam follower together comprising means for pivoting said drive arm in response to rotation of a cam ring forming part of the lens, wherein said drive arm, when pivoted, comprises means for moving said two frames.

The camera includes a zoom lens, and said frames are movable in response to movement of said zoom lens. The zoom lens is adapted to be rotatably driven by a motor which drives a rotatable gear, said lens having a sector gear thereon which is adapted to engage said rotatable gear so as to be rotatably driven by said motor.

The lens has a tapered camming surface positioned on a rear peripheral portion of the cam ring forming part of said lens. A drive arm is pivotably attached to a stationary camera shaft, with the arm having cam follower along a lower portion thereof which contacts said camming surface, said drive arm further comprising an upper, substantially Y-shaped recessed portion. One of the frames includes a forwardly projecting pin positioned within said Y-shaped recessed portion, wherein each of said frames includes a substantially horizontal portion and a substantially vertical portion, said pin being connected to one of said horizontal portions, with each of said horizontal portions including a toothed rack.

A single pinion engages both of said racks and comprises means for driving said frames over equal distances in opposite directions when said drive arm pivots in response to movement of the cam ring on said zoom lens. The drive arm is biased by a spring, with the spring comprising means for continuously biasing said cam follower against said camming surface. The camera further comprises pairs of upper and lower inner rails, wherein said inner rails, together with said frames, define said image plane size, wherein said inner rails being positioned forwardly of said film and rearwardly of said aperture frames. A pressure plate is located rearwardly of said film path, said plate being biased towards said inner rails by a spring attached to said camera body, wherein a film path is defined by the substantially tunnel-shaped space located between said rails and said plate.

A zoom lens controls the position of the exit pupil of the camera, and means are provided for moving the frames in response to movement of said zoom lens in order to adjustably define the size of the image plane. The camera can include means for maintaining the film plane substantially flat. The flat film plane maintenance means comprises said at least one movable frame and means for moving said frame substantially along the optical axis of a lens of said camera. The frame moving means is attached to a film winding and rewinding mechanism.

A spring is provided for normally biasing the frame towards said film plane. An electromagnetic actuating assembly comprises means for moving said frame away from said film against the biasing force of said spring during film winding and rewinding operations. The camera further comprises means for moving said frames closer to said film when said film is not being wound or unwound, and means for spacing the apertured frame(s) away from the film during winding and unwinding of the film. The frame is generally rectangular and has a flat surface facing said film and a central aperture of a size which is substantially equal to a predetermined standard image plane size.

The camera can further comprise a spring biased pressure plate positioned rearwardly of the film, and the frame can include a lower portion with first and second guide plates, each of said guide plates having a slot positioned generally perpendicularly with respect to said film path. The camera body includes inwardly extending guide pins, wherein respective ones of said guide plate slots ride on respective guide pins. The frame includes a flat surface substantially parallel to said film plane.

The camera further comprises at least one spring attached to each of said guide plates, said springs comprising means for continuously biasing said frame towards said film. The springs attached to said guide plates exert a tensile force which is less than the biasing force of a compression spring which presses said pressure plate against said film. At least one iron piece is attached to a front end of each of said guide plates, and the camera further comprises electromagnets in said camera body which are disposed oppositely from each of said guide plates. The electromagnets are energizable to selectively attract said pieces and to move said apertured frame(s) away from said film against the biasing force of springs attached to said guide plates.

A film winding motor and a release button are provided for selectively actuating said film winding motor and said electromagnets.

Alternately, the moving means can comprise mechanical actuating means. In such case, the frame is generally rectangular and has first and second lower front edges comprising flanges.

The camera body includes complementarily-shaped, stepped portions which are parallel to said flanges and which comprise stops for limiting motion of each aperture frame towards said film plane. Each frame includes a flat surface oppositely disposed to said film and an aperture of a size corresponding to a predetermined standard image plane size. The frame includes a front surface, and the camera further comprises an apertured frame actuating plate resiliently attached to said front frame surface by at least two spaced springs, and means for driving said actuating plate into engagement with said front frame surface. The actuating plate includes an elongated slot extending in a direction substantially perpendicular to the optical axis. The camera comprises a film winding and rewinding assembly having an eccentric driving pin engaged in said elongated slots, and the winding and rewinding assembly comprises a rotatable pinion gear adapted to be driven by a drive motor, said pinion gear meshing with a double gear supported by said camera body.

The double gear comprises a first complete gear with teeth around its entire periphery and a second, partial gear with teeth located along a portion of its outer periphery. A switching lever is mounted coaxially with said double gear and is rotatable with respect to said double gear to thereby comprise means for switching said camera from film winding to film rewinding operations, said lever including a free end attached to a planetary gear which is rotatably supported by said lever. A spool gear is adapted to engage said partial gear, thereby comprising means for winding said film, said spool gear being meshed, via an internal gear, with a sprocket driving gear having sprockets thereon. The double gear comprises means for winding said film by one frame when said double gear is wound over one rotation. The planetary gear selectively meshes with one of either an aperture frame driving gear or a first film rewinding gear in response to swinging motion of said lever: and the driving pin is mounted on an aperture frame driving gear. The moving means comprises an electromagnetic actuator assembly and a mechanical actuating assembly. The frame is generally rectangular and is biased away from said film by at least one spring attached to said camera body and to said frame, and the camera further comprises at least one stop for limiting motion of said frame away from said film.

The frame further comprises a charging pin adapted to bear against a rotatable cam, and the mechanical actuating assembly includes a first shaft rotatably driven by a motor, with a pinion gear being attached to said shaft and meshing with a first planetary gear rotatably positioned on an additional shaft which is attached to said camera body. A generally V-shaped switching lever is attached at one end to said additional shaft.

An intermediate gear is attached, via a common shaft, to an intermediate portion of said lever, wherein said lever is engaged with said first planetary gear, and a second planetary gear is attached to a second end of said lever, said lever being adapted to swing in both clockwise and counterclockwise directions. The camera further comprises a sprocket drive gear whose sprockets engage teeth on said intermediate gear, said cam being integrally attached to said second planetary gear, and said cam being curved, wherein said pinion gear engages a spool gear.

A first rewinding gear is adapted to selectively engage said second planetary gear, and a second rewinding gear is provided having a first rewinding shaft which is integrally attached thereto. A restricting lever is pivotably attached to the bottom of said camera body and comprises means for maintaining said frame in a closely adjacent position to said film, said lever having a hook at one end and an attractive portion at a second, rear end. The camera further comprises an electromagnet oppositely disposed from said portion, wherein said lever is continuously biased by a spring to force said hook into abutment with a front face of said frame, wherein said electromagnet, when activated, comprises means for rotating said restriction lever against the bias of said spring.

As is well known, in one embodiment of the invention the film is adapted to be guided, along its rear surface, by a pressure plate which comes into contact with outer rails along its upper and lower edges; and the upper and lower edges of the film are guided by inner rails. In this fashion, the film is capable of moving without contacting the aperture defining plane. During movement of the film towards the aperture, the resilient characteristics of the film which cause it to tend to coil can be gradually eliminated.

As a result, the portion of the film located in the area of a patrone chamber tends to easily contact the aperture defining plane; and this tendency of the film to coil decreases as this portion of the film comes closer to the aperture. Accordingly, it is reasonable to project only the peripheral portion of the aperture defining plane towards the inner rails. Specifically, projecting only a peripheral portion of the aperture defining plane towards the inner rails will not substantially increase the possibility that the projecting portion of the aperture defining plane will contact the film. The projecting portion of the aperture defining plane is positioned quite close to the plane of the film, and, accordingly, rearward movement of the exit pupil causes only a slight increase in the size of the image plane in the lateral direction, thereby maintaining and restricting the image plane size within the predetermined standard.

The projecting peripheral portions of the aperture defining plane can be easily achieved, e.g., by using a die cast material, which requires only a few additional operations in order to manufacture the camera body from a die cast material.

In an other aspect the present invention provides apparatus for controlling the size of an image plane in a camera. The apparatus comprises a frame with an aperture in an aperture defining plane, said plane being located forwardly of inner rails on said frame, the camera having a rear cover and a pressure plate attached to said rear cover. The plate and the inner rails together define a tunnel-shaped path for film to move. The aperture includes a peripheral area defining said aperture, said peripheral area including at least one projection adapted to extend towards said inner rails.

The inner rails respectively define upper and lower edges of the aperture. There are two projections, one of said projections defining a left hand border of said aperture and a second of said projections defining a right hand border of said aperture. Each projection is connected to a substantially flat aperture defining frame portion by an inclined ramp. Each projection is substantially flat and is positioned in a substantially parallel fashion to the frame portions. Each aperture is substantially rectangular.

Brief Description of Drawings

The above and other objects, features, and advantages of the present invention will become more fully apparent from the accompanying drawings, in which similar reference numerals represent similar parts throughout the several views, and wherein:

FIGS. 1-3 illustrate a first embodiment of an apparatus for controlling image plane size in accordance with the present invention, in which:

FIG. 1 is a perspective view of a main portion of the control apparatus of the present invention;

FIG. 2 is a sectional view taken along line II—II of FIG. 1; and

FIG. 3 is a schematic plan view showing the positional relationship between the movable frames of FIG. 1 and an exit pupil of the camera lens;

FIGS. 4–7 illustrate a second embodiment of an apparatus for controlling the size of an image plane in accordance with the present invention, in which:

FIG. 4 is a side elevational view of a main portion of the control apparatus in a first operational position;

FIG. 5 is a side elevational view of the control apparatus of FIG. 4, in a second operational position;

FIG. 6 is a schematic perspective view of an aperture frame of the apparatus of FIG. 4; and FIG. 7 is a time chart illustrating the operation of a release switch, a film winding motor, and an electromagnet;

FIGS. 8–11 illustrate a third embodiment of an apparatus for controlling the size of an image plane in accordance with the present invention, in which:

FIG. 8 is a top plan view of a main portion of the control apparatus in a first operational position;

FIG. 9 is a top plan view of the control apparatus of FIG. 8 shown in a second operational position;

FIG. 10 is a sectional view of an aperture frame, outer rails, and pressure plate of the apparatus of FIGS. 8 and 9; and FIGS. 11A, 11B, 11C and 11D, respectively, are schematic plan views of a main portion of the control apparatus of FIGS. 8–10 illustrated in successive operational positions;

FIGS. 12–16 illustrate a fourth embodiment of an apparatus for controlling the size of an image plane formed in accordance with the present invention, wherein:

FIG. 12 is a top plan view of a main portion of a control apparatus in a first operational position;

FIG. 13 is a top plan view of the control apparatus of FIG. 12 in a second operational position;

FIG. 14 is a side elevational view of a main portion of the control apparatus of FIGS. 12 and 13 in a first operational position;

FIG. 15 is a side elevational view of the portion of the control apparatus of FIG. 14 shown in a second operational position.

BEST MODE FOR CARRYING OUT THE INVENTION

Figure 1:
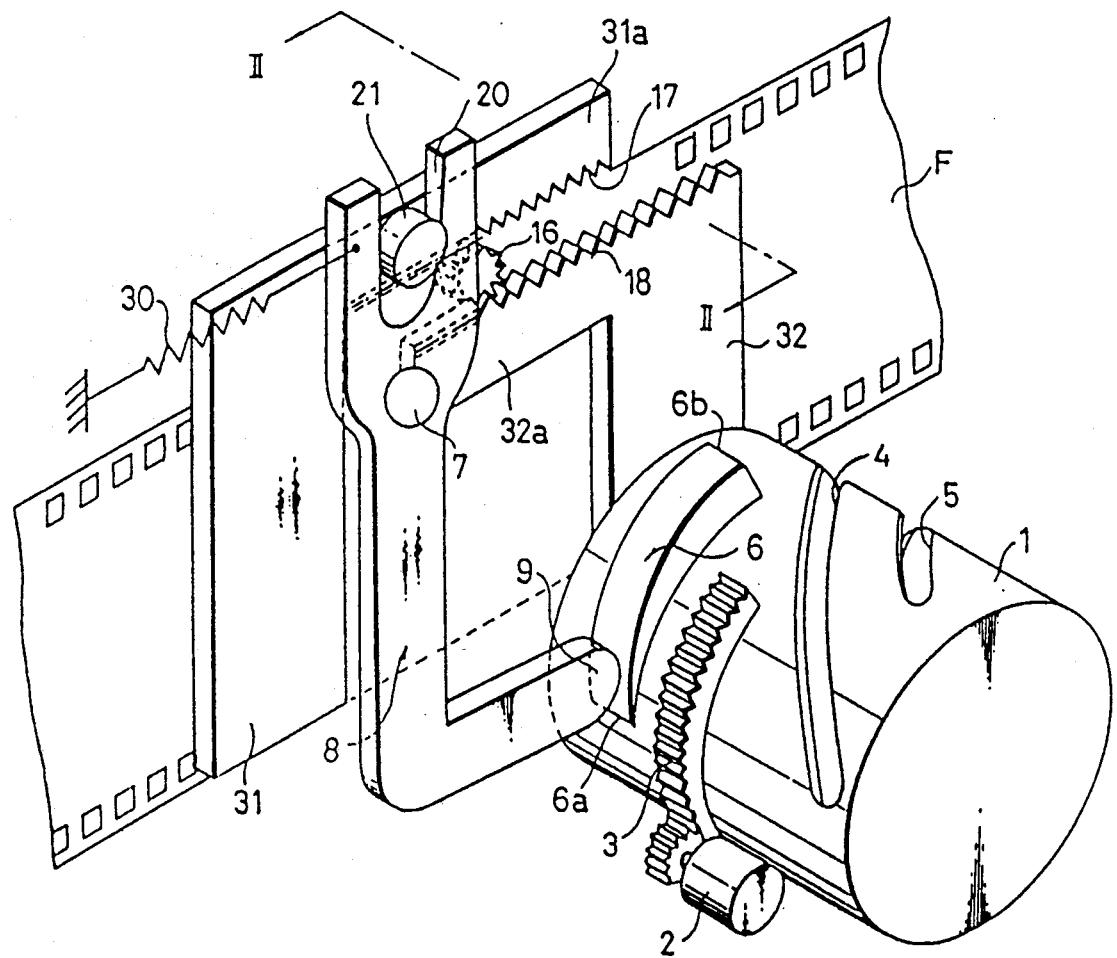

The present invention will now be described in greater detail with respect to the drawings, in which FIGS. 1–3 represent a first embodiment of the present invention. In the first embodiment, the idea of improving the flatness of the film plane is not a main consideration.

FIG. 1 illustrates a main portion of a camera having a zoom lens in which the lens system includes a cam ring 1. The cam ring is adapted to be rotated by a drive motor 2 via a sector gear 3 which moves front and rear lens element groups (not shown in the drawings) along the direction of the optical axis. Zooming cam grooves 4 and 5 are provided on the exterior surface of the cam ring in order to effect zooming of the lens. Cam ring 1 is provided about its outer (and rear) periphery with a cam surface 6 against which a cam follower 9, provided on a lower portion of drive arm 8, is adapted to abut. The drive arm 8 is rotatably supported by a stationary shaft 7. Drive arm 8 is biased by spring 30 to continuously press cam follower 9 against cam surface 6 on ring 1. As best seen in FIG. 1, camming surface 6 has a substantially curved exterior surface with a gradually increasing height, as measured about the outer peripheral surface of cam ring 1, so that when cam ring 1 rotates, drive arm 8 is rotated about shaft 7 by virtue of its engagement with the exterior portion of cam surface 6.

A pair of left and right movable frames 31 and 32, respectively, which are movable in directions parallel to the direction of movement of film F, are provided in front of the film plane along which the film moves. Frames 31 and 32, when taken together with upper and lower inner rails 12 (see FIG. 2) which can come into contact with upper and lower edges of the inner face of film F, define the aperture which, in turn, defines the image plane size.

Outer rails 14, which are per se known, are provided, both above and below inner rails 12, respectively, in order to bear against the upper and lower edges of a pressure plate 10 located on a back cover of the camera (which back cover is not shown in the drawings) in order to restrict the position of pressure plate 10. In this fashion, film F will move along a tunnel-like passageway defined by and between the pressure plate 10 and inner rails 12, as shown in FIG. 2.

Movable frames 21 and 32 have associated lateral plate portions 31a and 32a, respectively, which are disposed oppositely to each other and which are provided with racks 17 and 18, respectively. These racks have teeth which are engaged by a single common pinion 16 located between lateral plate portions 31a and 32a. With such a gearing arrangement, movable frames 31 and 32 can laterally move, in opposite directions, perpendicular to the optical axis, while maintaining a symmetrical positional relationship between them. Movable frame 31 includes a generally cylindrical projection 21 which is engaged within Y-shaped fork or recess 20 on the upper end of drive arm 8, so that as the drive arm rotates about shaft 7, movable frames 31 and 32 will laterally move as a result of the movement of projection 21 on frame portion 31a. In other words, the pivoting motion of the drive arm translates into oscillating motion of projection 21 and causes relative movement of frames 31 and 32 in equal distances and in opposite directions.

Cam surface 6 is shaped so that the exit pupil in the zoom lens system will be located at its forwardmost position, and at its most distant location from film F, when cam follower 9 of drive arm 8 contacts the lowest end 6a of cam surface 6. As in the position of FIG. 1, the exit pupil will be located at its rearmost position, closest to film F, when cam follower 9 contacts the highest end 6b of cam surface 6.

With such an arrangement, when cam ring 1 is rotated for zooming, drive arm 8 will rotate in accordance with the shape of cam surface 6 which abuts cam follower 9 so as to move movable frames 31 and 32 rightwardly and leftwardly, respectively, with respect to the optical axis of the camera; the movable frames will be moved in opposite directions over the same displacement. The angular displacement of drive arm 8 about stationary shaft 7 in the clockwise direction, as viewed in FIG. 1, will be larger when the exit pupil is closest to film F, so that movable frames 31 and 32 will be most closely located to each other in this position. To the contrary, angular displacement of drive arm 8 will be the smallest when the exit pupil is farthest away from film F, so that movable frames 31 and 32 will then be brought into their largest spaced position. Thus, the size of the actual image plane can always be controlled within predetermined limits by properly designing the shape of camming surface 6.

FIG. 3 illustrates the positional relationship between the exit pupil and movable frames 31 and 32 by providing one example thereof. In FIG. 3, S represents the closest position of the exit pupil, i.e., a position in which the lens system comes closest to film F, and L represents the farthest position of the exit pupil, in which the lens system is located farthest from film F. Assuming for a moment that the exit pupil is in position S, the pupil will have an exit pupil radius rS, with the image plane size being defined by the ray of light cS. When the exit pupil is in position L, the exit pupil will have an exit pupil radius rL and the image plane size will be defined by a ray of light cL. Accordingly, it will be necessary to move movable frames 31 and 32 into positions designated by the solid line (when the exit pupil is in position S) and the dotted line (when the exit pupil is in position L), in order to make the actual image plane size defined by the ray of light cS identical to the actual image plane size defined by the ray of light cL, irrespective of the change in position and radius of the exit pupil, respectively.

Figure 17:
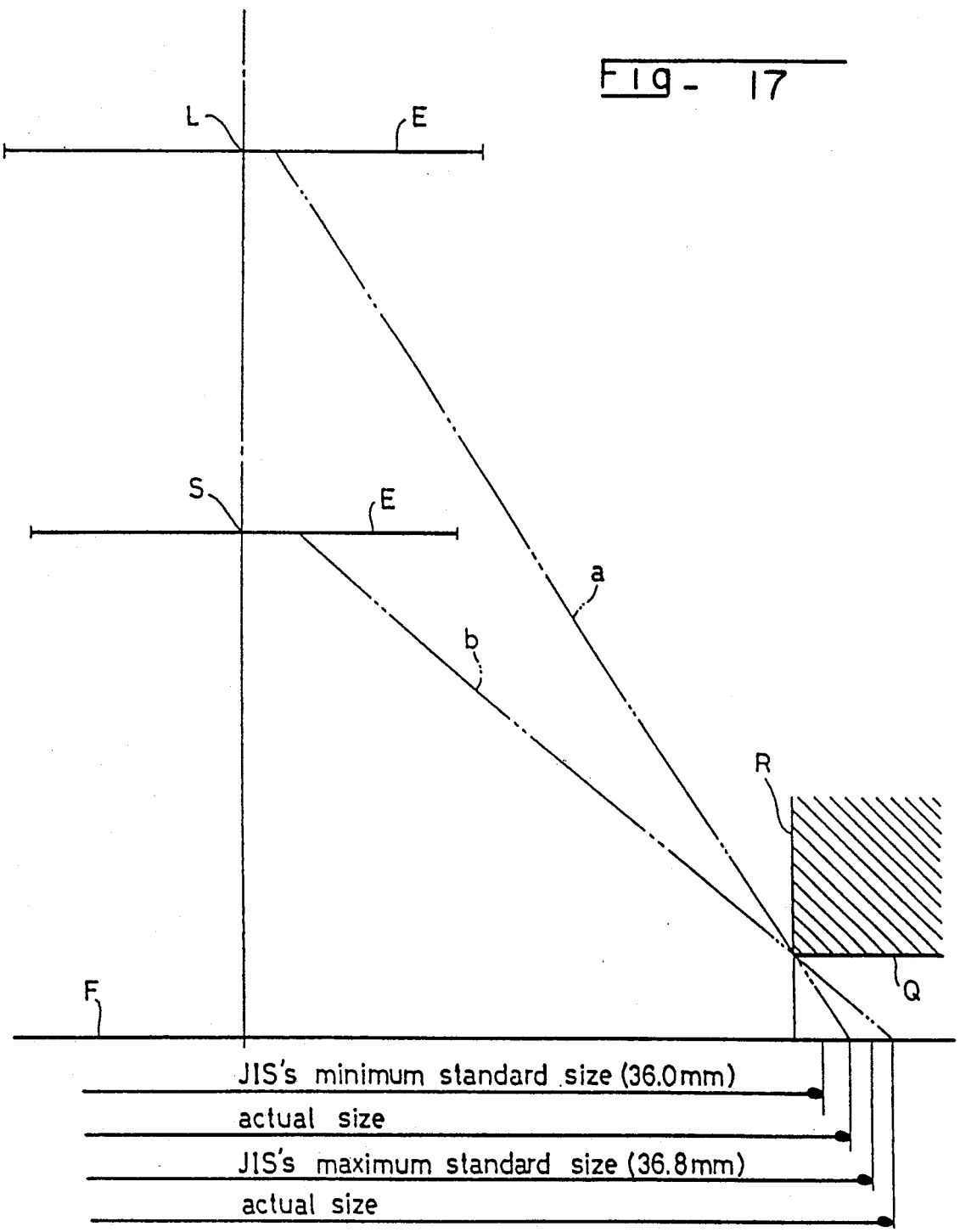
FIG. 17 is a graph illustrating the disadvantages of the prior art which are overcome by the apparata of the present invention.

It should be appreciated that in practice it is not necessary to strictly control the movement of movable frames 31 and 32 in order to always establish a precisely identical image plane size, since the image plane size can have a predetermined tolerance which lies in a range in accordance with predetermined standards, as illustrated in FIG. 17.

The curved profile of camming surface 6 has been shown in an exaggerated fashion in FIG. 1 for the purpose of clarifying and best illustrating the principles of movement of the cam ring 1 and the drive arm 8, which has a cam follower 9 abutting cam surface 6.

It should also be noted that the present invention is not directed to the particular lens system which is used, and, accordingly, the details of the lens system used for varying the focal length in response to rotation of the cam ring 1 are not illustrated in the drawings.

Second, third and fourth embodiments of the present invention will now be described in detail; each of these embodiments is intended to control image plane size, as described above.

Figure 6:
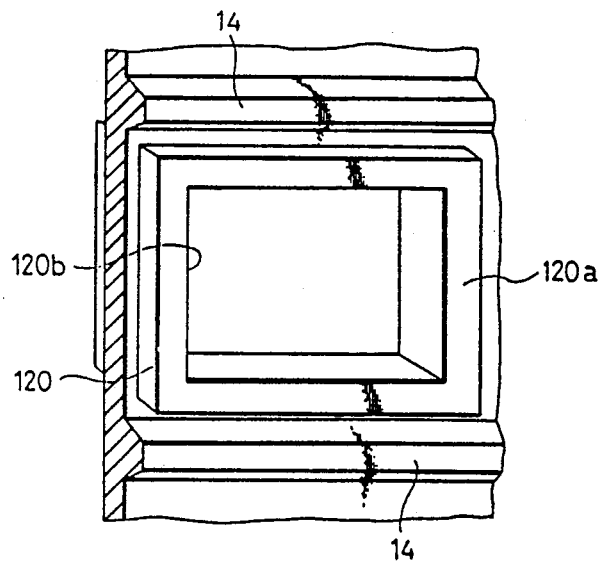

In order to achieve a substantially complete flatness for the film, in the second, third and fourth embodiments, an aperture frame 120 (as shown in FIG. 6) is provided which is capable of approaching and moving away from the film plane F along the optical axis of the camera lens. The aperture frame is adapted to approach the film when the film is completely wound, in order to form a tunnel-shaped gap or space for the film to traverse between the frame and the pressure plate, and to move away from the film both during winding and rewinding of the film.

Figure 18:
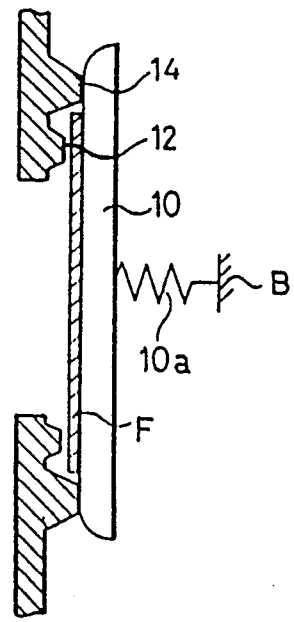
FIG. 18 is a longitudinal sectional view of a pressure plate and inner rails in a known camera.
Figure 19:
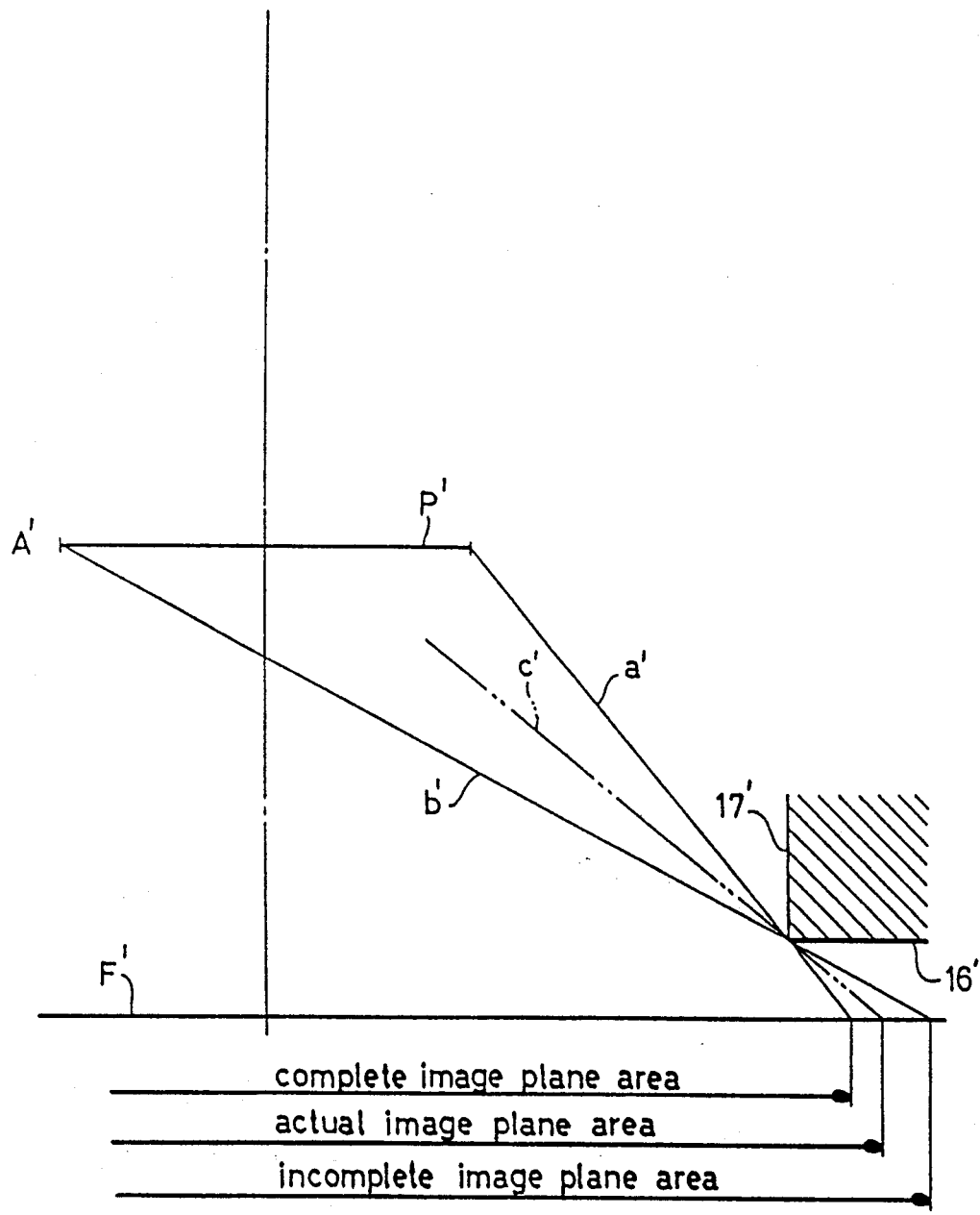
FIG. 19 is an enlarged view of an image plane of a camera illustrating a disadvantage of the image plane size in a known device.

FIGS. 4–7 illustrate the second embodiment of the present invention, in which the aperture frame is actuated by an electromagnetic actuating means. Aperture frame 120 is provided in front of pressure plate 10, which pressure plate is per se known, as shown in FIG. 18, and is adapted to move in two directions along the optical axis of the imaging lens system of the camera. Aperture frame 120 is generally rectangular and includes a flat surface 120a located opposite to film F. Aperture frame 120 also includes a central aperture 120b which corresponds to the standard image plane size determined, e.g., by JIS.

Figure 4:
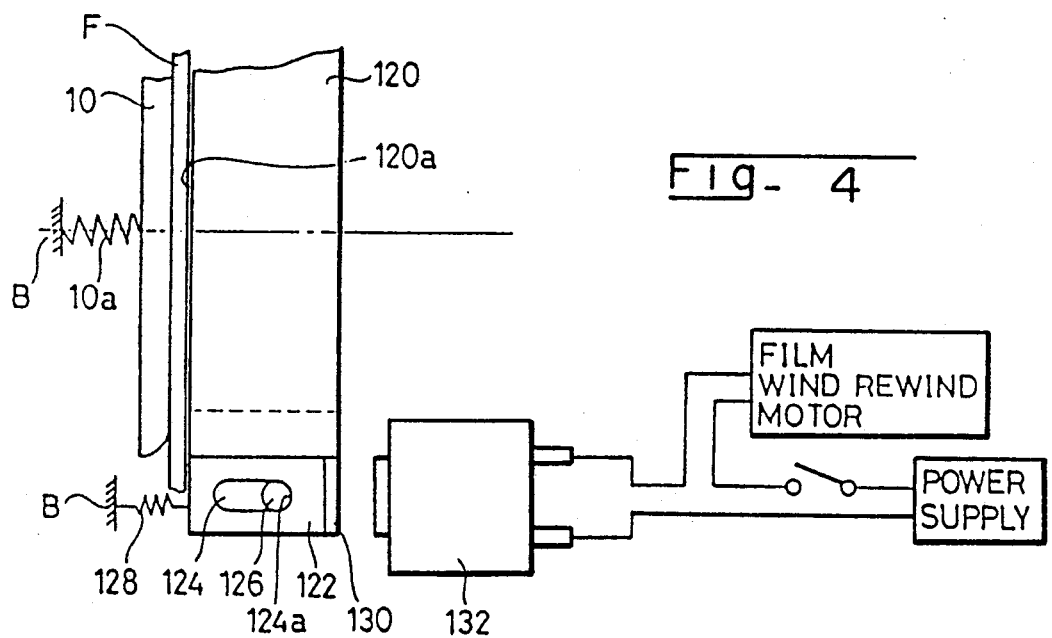
Figure 5:
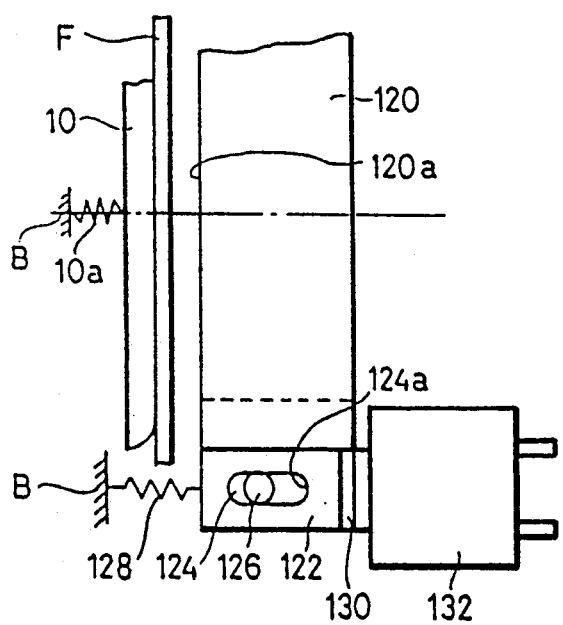

Aperture frame 120 is provided, along its lower opposite end, with right and left guide plates 122, only one of which is illustrated in FIGS. 4 and 5. The guide plates are substantially identical, and each includes a guide slot 124 which extends in a direction perpendicular to the plane of the film. The guide slot includes a forward end 124a which serves, via its selective engagement with pin 126, to limit rearward movement of the frame into a position closely adjacent to the film plane. A pin/slot engaged position is shown in FIG. 4. Guide pins 126, which are provided on camera body B, are engaged in the respective guide slots 124, so that aperture frame 120 can be moved in a direction perpendicular to the film plane while maintaining the parallel relationship between flat surface 120a of the aperture frame and the film plane. Springs 128, one of which is illustrated in FIGS. 4 and 5, are provided between each guide plate 122 and camera body B; these springs are adapted to continuously bias the aperture frame 120 towards film F.

Figure 7:
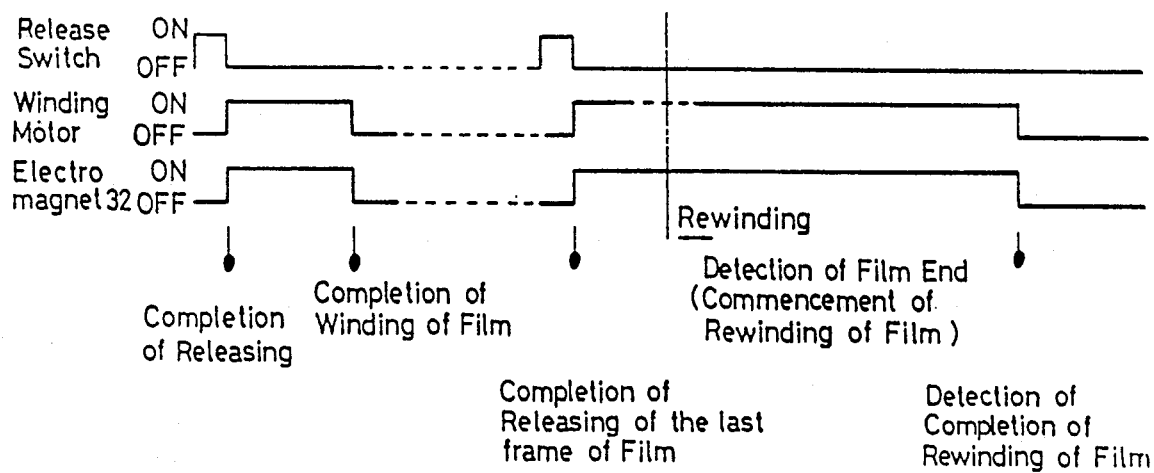

Iron members or pieces 130 are attached to the front ends of each guide plate 122 and are located opposite from electromagnets 132, which are provided in the front of the guide plates. The electromagnets 132 form, together with the attractive iron members 130, an electromagnetic actuating means. Electromagnets 132 are energized to attract corresponding iron pieces 130 in order to move aperture frame 120 away from film F, thereby overcoming the biasing force of spring 128, as shown in FIG. 5. The electromagnets 132 are activated as described hereinafter. FIG. 7 is a timing chart illustrating the relationship between the operation of electromagnets 132, a camera release button or switch (illustrated schematically), and a winding motor (again illustrated schematically) for winding film F. Both the winding motor and release button are well known and are not illustrated in detail because their details do not form a portion of the present invention.

As seen in FIG. 7, when the release button is pushed, a release signal is turned to its ON position, so that releasing will be effected. When the releasing operation is completed, i.e., when the release signal is turned to OFF, electromagnets 132 and the film winding motor will be actuated. When the film winding motor and the electromagnets 132 are turned ON, iron pieces 130 of aperture frame 120 will be attracted by energized electromagnets 132, so that aperture frame 120 will move away from film F. In this state, in which aperture frame 120 is located away from the film, the film will be wound over one frame by the film winding motor. When film F is wound by one frame, a film winding completion signal is issued, so that the winding motor and electromagnets 132 will be deenergized. As a result of this deenergization, aperture frame 120 will be returned to its initial position in which the aperture frame is moved into a position closely adjacent to film F via the action of return springs 128.

The above operation is repeated until the picture on the last film frame has been taken. When no film frames remain to be taken, a signal representing the end of the film is issued so as to energize electromagnets 132; iron pieces 130 of the aperture frame 120 will again be attracted by electromagnets 132 in order to further separate or space aperture frame 120 away from film F. Simultaneously, the film winding motor will be energized to reverse and thereby rewind film F.

When rewinding of the film terminates, a signal representing completion of film rewinding is issued, and electromagnets 132 and the film winding motor are thus deenergized.

In accordance with this second embodiment of the present invention, upon releasing, aperture frame 120 will closely approach film F in order to restrict the image plane size and to form a tunnel-shaped traversing path for film F between pressure plate 10 and the frame, thus improving the flatness of the film F. When film F is being wound and rewound, aperture frame 120 will be moved away from film F under the influence of electromagnets 132, and, accordingly, the film emulsion layer will not be damaged. Additionally, resistance to movement of film F will be decreased by such movement, resulting in a decrease in power consumption which need to be supplied from the motor.

Although the entire aperture frame approaches and moves away from the film in the embodiment which is illustrated, it is also possible to move only a portion of the aperture frame, e.g., only right and/or left edge areas of the aperture frame which could be formed as separate portions of the aperture frame would then need to be moved away from a major portion of the aperture frame. This is true in cases in which the image plane size in the vertical direction is restricted by the inner rails which have been discussed previously.

FIGS. 8–11 illustrate a third embodiment of the present invention, in which the aperture frame is mechanically actuated by a mechanical actuating means rather than by an electromagnetic actuating means, as in FIGS. 4–7.

Figure 8:
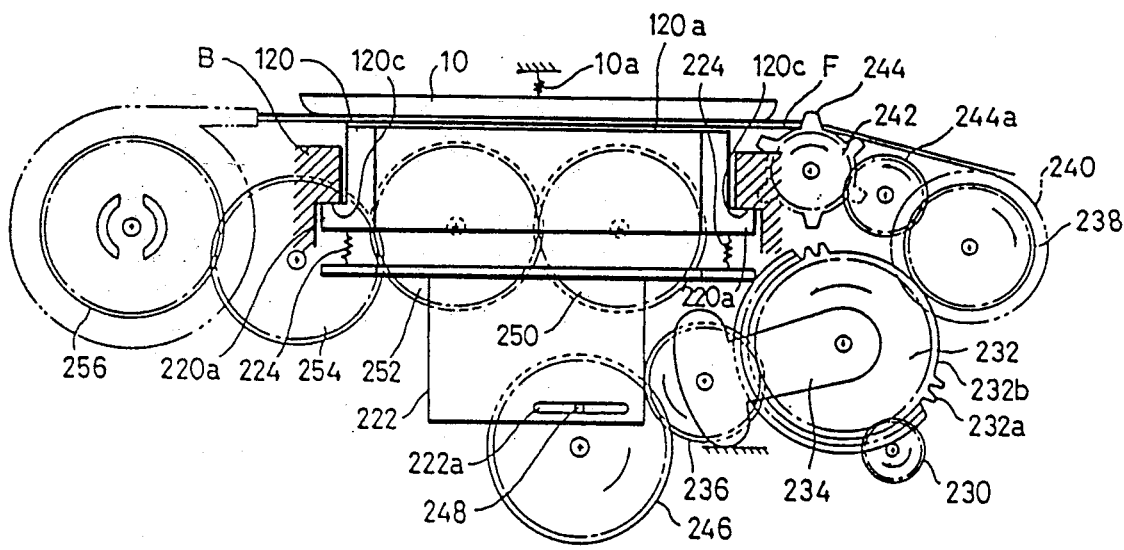
Figure 9:
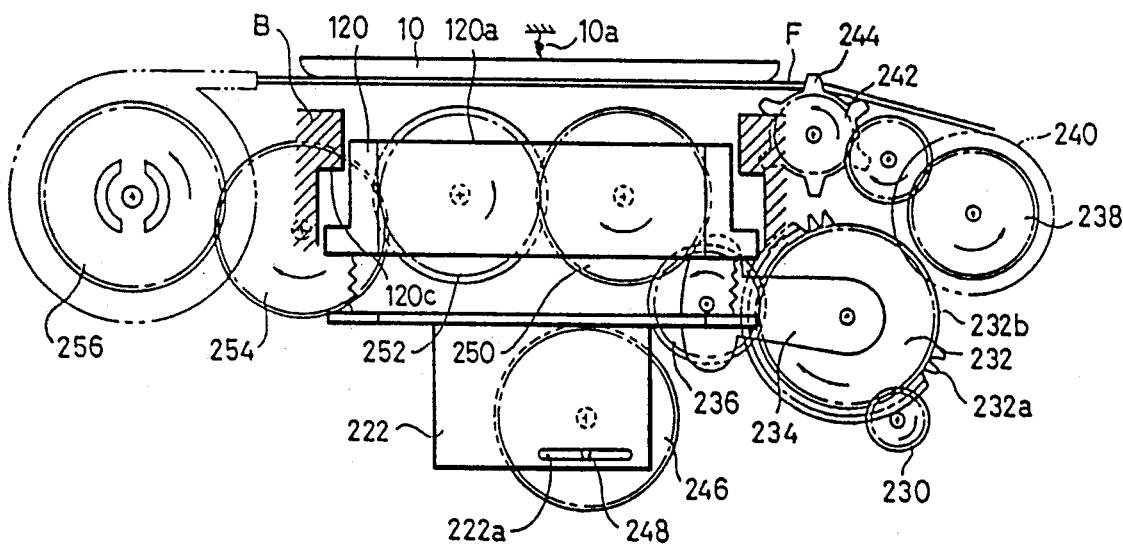

Aperture frame 120 is generally rectangular, with a shape similar to that of the aperture frame in the second embodiment, and includes a front lower right edge flange 220a and a front lower left edge flange 220a, as illustrated in FIGS. 8 and 9. Flanges 220a will come into abutment with stepped portions 120c formed on camera body B in order to limit the position of the aperture frame 120 in which it is most closely adjacent to film F. Aperture frame 120 includes a flat surface 120a located opposite from film F and an aperture 120b which corresponds to a predetermined standard image plane size in accordance with the JIS.

An aperture frame actuating plate 222 is attached to a front lower end of aperture frame 120 via right and left hand springs 224, as shown in FIG. 8. Actuating plate 222 is provided with an elongated slot 222a which extends in a direction perpendicular to the optical axis of the camera and which is adapted to be associated with a film winding and rewinding mechanism.

One embodiment of a film winding and rewinding mechanism, and its associated connecting mechanism, will hereinafter be described. Pinion gear 230 is connected to a drive shaft (not shown) on a drive motor (also not shown) and is adapted to mesh with an entire gear 232a of a double gear 232 which is rotatably supported on camera body B. Double gear 232 comprises a complete gear 232a, which includes teeth about its entire outer periphery, and a partial gear 232b, which has a diameter smaller than the diameter of complete gear 232a, and which includes teeth only along a portion of the outer periphery of partial gear 232b.

Double gear 232 is attached to a switching lever 234 which is coaxial with the gear and which is rotatable relative to double gear 232 to switch between film winding and rewinding operations. Switching lever 234 is provided, along a free end thereof, with a planetary gear 236 which is rotatably supported by switching lever 234 and which meshes with the complete gear 232a of double gear 232. Switching lever 234 reverses the directions of its swinging motions in accordance with the directions of rotation of double gear 232.

The partial gear 232b of double gear 232 can be engaged by a spool gear 238 which is connected to a spool 240 for winding the film via a friction member (not shown in the drawings). Spool gear 238 meshes with sprocket driving gear 242, having sprockets 244, via an intermediate gear 244a. These gears are formed so that when double gear 232 rotates by one turn, the film will be wound by one frame.

Planetary gear 236 selectively meshes with an aperture frame driving gear 246 or a first film rewinding gear 250 of a film rewinding gear train in accordance with rotation caused by the swinging movement of switching lever 234. Specifically, when pinion gear 230 rotates in a clockwise direction, as shown in FIG. 8, in order to effect a winding operation, switching lever 234 will rotate in a counterclockwise direction, so that planetary gear 236 will come into engagement with aperture frame driving gear 240. To the contrary, when the pinion gear rotates in a counterclockwise direction, as illustrated in FIG. 9, in order to effect a rewinding operation, switching lever 234 will rotate in a clockwise direction, so that planetary gear 236 will come into engagement with first rewinding gear 250.

Aperture frame driving gear 246 includes an eccentric driving pin 248 which is fitted within elongated slot 222a of a respective actuating plate 222. The first film rewinding gear 250 is engaged by a film rewinding gear 256 which is integrally attached to a film rewinding shaft (not illustrated) via gears 252 and 254 of the gear train.

Figure 10:
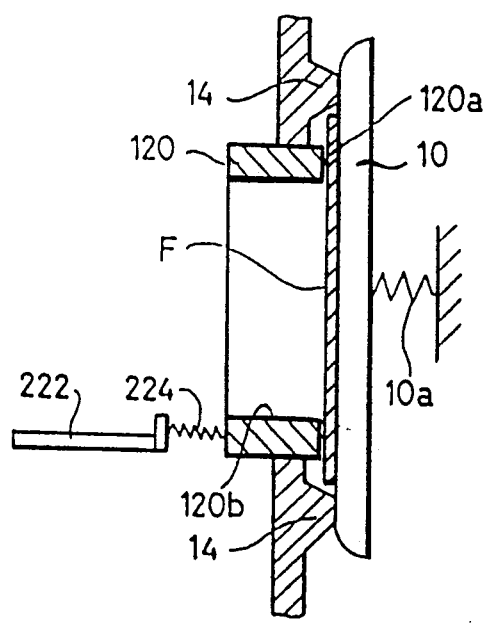

FIGS. 11A, 11B, 11C and 11D illustrate operation of the apparatus of FIGS. 8-10. In each of these FIGS., neither switching lever 234 nor planetary gear 236 are illustrated, and only one spring 224 is shown, in order to clarify explanation of the operation of this device.

Upon completing preparation for taking a photograph, i.e., when the film has been completely wound by one frame, aperture frame driving gear 246 will stop at a dead point, at which point driving pin 248 will most closely approach pressure plate 10, as illustrated both in FIGS. 8 and 11A. In this position, springs 224 are compressed, and, accordingly, aperture frame 120 will come into abutment with stepped portions 120c of camera body B at flanges 120a of aperture frame 120, such that the rear face of aperture frame 120 will closely approach film F. Accordingly, the image plane will be strictly restricted by the aperture of aperture frame 120, which moves into a position closely adjacent to film F. Specifically, frame 120 and plate 10 are spaced so as to form a tunnel-shaped gap or space within which the film will be guided for movement. Furthermore, in this position, spool gear 238 will face a toothless portion of partial gear 232b, along which no teeth are provided.

When the release button is pushed to effect a releasing operation, the motor rotates in order to rotate pinion gear 230 in a clockwise direction. Rotation of pinion gear 230 in this clockwise direction causes the complete gear 232a, which meshes with pinion gear 230, to rotate. As a result of this rotation, double gear 232 rotates, and the rotation of complete gear 232a is transmitted to aperture frame driving gear 246 via planetary gear 236, so that driving pin 48, and, accordingly, aperture frame actuating plate 222, will separate or become spaced from pressure plate 10. This causes further separation of aperture frame 120, which is connected to aperture frame actuating plate 222 via spring 224, away from film F, thereby permitting film to travel freely during unwinding and rewinding.

On the other hand, since spool gear 238 is located opposite the toothless portion of partial gear 232b, the spool gear will not rotate for a certain period of time after the motor begins rotation, i.e., until it engages the teeth on the partial gear. When aperture frame 120 moves completely away from film F, the toothed portion of partial gear 232b will engage spool gear 238 to rotate the spool gear, as illustrated in FIG. 11B. As a result of such engagement, film F will be wound, as shown in FIG. 11C, by spool 240.

When the toothless portion of partial gear 232b is again located opposite from spool gear 238, the film winding operation will end, so that spool gear 238 will stop its rotation, as shown in FIG. 11D. In this position, the motor will continue rotation in order to rotate aperture frame actuating gear 246. Each time the aperture frame actuating gear 246 rotates by one turn, i.e., when all the components are positioned as illustrated in FIG. 8, the motor will stop and the film winding will terminate. The release operation will be effected in the position illustrated in FIG. 8, and when this releasing operation ends, all of the above-noted operations will be repeated.

Rewinding of the film is carried out as will now be hereinafter described. When the end of a roll of film F is detected (by a conventional film sensor), the film rewinding operation will automatically start in response to a detection signal which is sent to the film rewinding assembly. The motor is then reversed to rewind film F and thus rotate pinion gear 230 in a counterclockwise direction, as illustrated in FIG. 9. This reverse rotation of the pinion gear 230 causes switching lever 234 to rotate in a clockwise direction, so that planetary gear 236 will move away from the aperture frame actuating gear 246 and will come into engagement with the first rewinding gear 250. As a result of this engagement, rotation of the first rewinding gear 250 is transmitted to gear 256 via the gear train (including gears 252 and 254) to effect rewinding of film F.

When the end of the film is detected prior to the rewinding operation of film F, the film will stop moving in any stage of the winding operation (in a position between that shown in FIGS. 11B and 11C), such that the film will be placed under tension. After this stage, film rewinding will begin while aperture frame 120 moves away from film F. Further, when the operation is switched to the rewinding stage, planetary gear 236 will move away from aperture frame actuating gear 246, so that the aperture frame actuating gear 246 will not rotate. Accordingly, there is no possibility that aperture frame 120 will come into contact with the emulsion layer of film F during winding or rewinding, and will therefore not result in damage to the film emulsion layer.

Although in the embodiment which is illustrated aperture frame 120 is entirely movable away from and towards film F, it is also possible to move only right and left hand edges of the aperture frame, which may be formed as separate parts from the remaining body portion, in cases in which the image plane size, in the vertical direction, is otherwise restricted by the presence of the upper and lower inner rails.

FIGS. 12-16 illustrate the fourth embodiment of the present invention, in which the aperture frame is actuated by a combination of an electromagnetic actuator as illustrated in the second embodiment of the invention and a mechanical actuator as illustrated in the third embodiment of the invention.

In the fourth embodiment, the aperture frame 120 is again generally rectangular in configuration, similar to the other embodiments of the invention. The aperture frame is continuously biased away from film F by springs 322, which are positioned between the camera body and the aperture frame. The farthest position of aperture frame 120 from film F is limited by a stop 324 provided on the camera body. Aperture frame 120 includes a charging pin 326 which is adapted to bear against a charging cam 342.

Pinion gear 330, which is secured to a drive shaft on a drive motor (neither of which is illustrated in the drawings) meshes with planetary gear 332, which is rotatably supported by shaft 334 of the camera body. The shaft includes a generally V-shaped, bent switching lever 336 which is rotatably supported and which has an intermediate gear 338 attached to a shaft at an intermediate portion of the lever. Intermediate gear 338 then engages a first planetary gear 332. A second planetary gear 340 is rotatably mounted on the front end of the switching lever and is adapted to be engaged by intermediate gear 338. In this manner, the switching lever will selectively swing in clockwise and counterclockwise directions, in accordance with the directions of rotation of planetary gear 332. As a result, intermediate gear 338 will move away from and close to a sprocket drive gear 346 having sprockets 348 integrally attached thereto, in accordance with the direction of swinging motion of switching lever 336. Charging cam 342 is integrally attached to planetary gear 340, and has a curved profile, as illustrated best in FIGS. 12 and 13. Pinion gear 330 also engages a spool gear 344, which is frictionally engaged by a spool (not illustrated in the drawings).

A first rewinding gear 350 is provided on the camera body and is adapted to selectively engage and move away from sun gear 340, in accordance with the selected swinging motion of switching lever 336; and the camera is also provided with rotatable gears 352 and 354, which transmit rotation of first rewinding gear 350 to rewinding gear 356, which includes a film rewinding shaft 356a integrally attached thereto.

Figure 12:
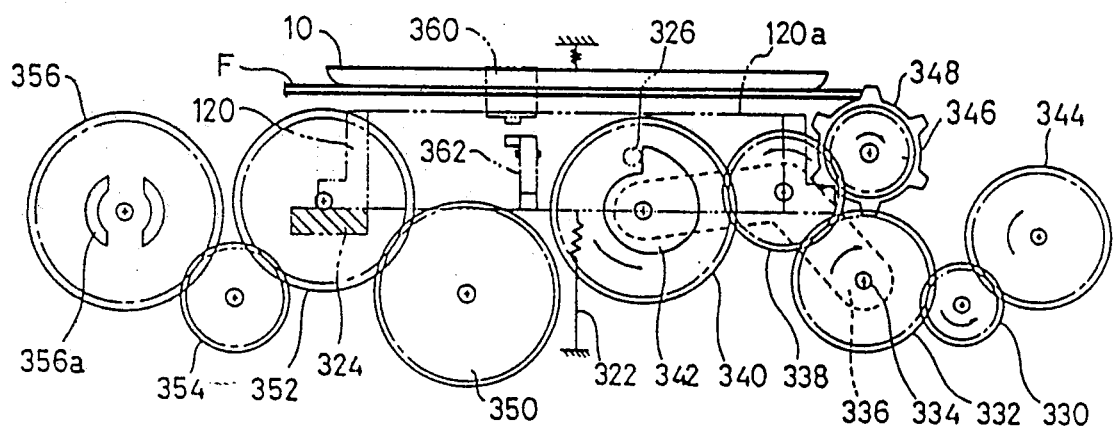

With such an arrangement, when pinion gear 330 rotates in a counterclockwise direction, as illustrated in FIG. 12, switching lever 336 will rotate in a clockwise direction in order to bring intermediate gear 338 into engagement with sprocket drive gear 346 so as to rotate sprocket 348, in order that the film will be wound by the sprocket.

Figure 13:
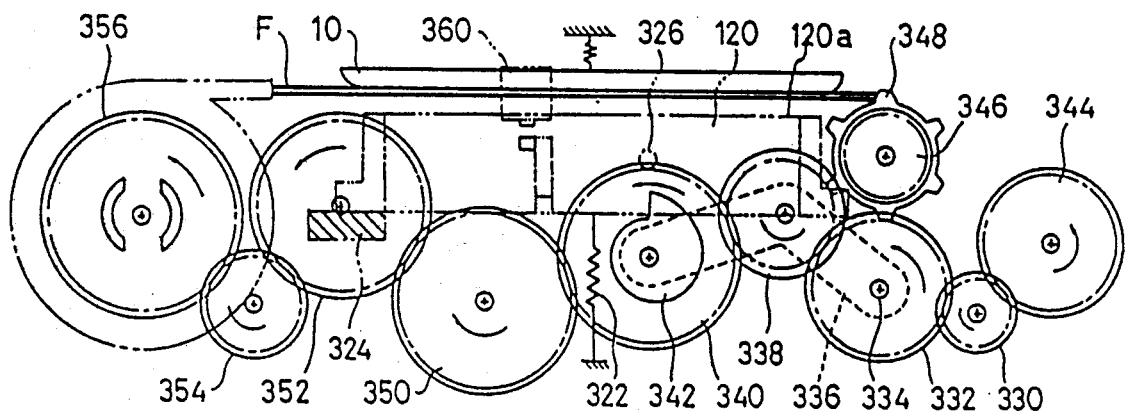

To the contrary, when pinion gear 330 rotates in a clockwise direction, as illustrated in FIG. 13, switching lever 336 will rotate about shaft 334 in a counterclockwise direction, so that the planetary gear 340 will come into engagement with the first rewinding gear 350, such that rewinding shaft 356a will rotate in order to wind film F.

Figure 14:
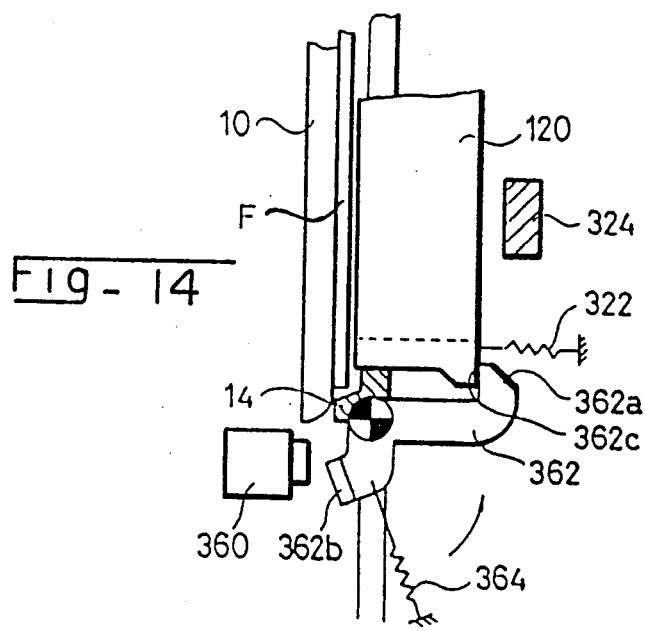
Figure 15:
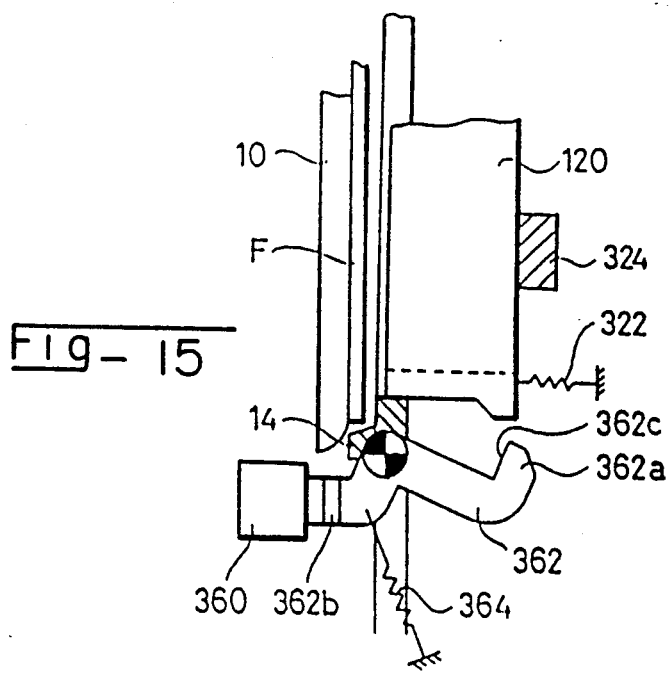

Behind and below aperture frame 120 a restriction mechanism for the aperture frame is provided, as best shown in FIGS. 14 and 15. This restriction assembly is adapted to retain aperture frame 120 in a photographing position in which the aperture frame is moved into a position closely adjacent to film F, against the bas of spring 322. The restriction assembly has a restriction lever 362 which is pivotably connected to the bottom of the camera body. Lever 362 includes a hook 362a at its front end which is adjacent to aperture frame 120, and an attracting member 362b at its rear end, opposite to the front end. The attraction piece 362b is located opposite to an electromagnet 360. Restriction lever 362 is continuously biased by springs 364 such that hook 362a will come into abutment with the front face of aperture frame 120. Inner hook surfaces 362c, as shown in FIGS. 14 and 15, are provided to engage the front frame surface and maintain frame 120 in a position closely adjacent to film F, forming a tunnel-shaped gap, between the plate and the frame. In other words, hooks 362a and surfaces 362c serve to maintain frame 120 close to, but spaced from, the film plane of film F. Electromagnet 360 will attract, when activated, attractive piece 362b so as to rotate restriction levre 362 against the bias of spring 364. This rotation, as shown in FIG. 15, will cause hook 362a to move downwardly to free frame 120 to move, under the influence of spring 332, into abutment with stop 324.

The operation of the apparatus of the fourth embodiment of the invention will now be described, particularly with respect to FIGS. 16A-16D.

Figure 16A:
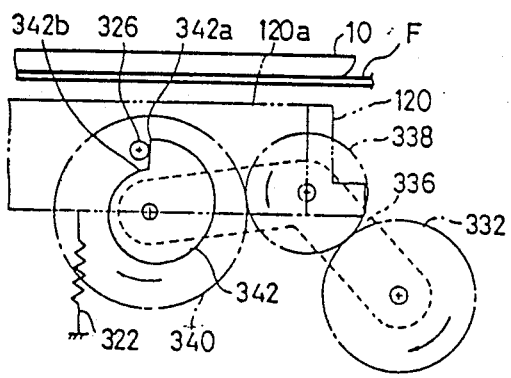
FIGS. 16A, 16B, 16C, and 16D, respectively, are respective schematic plan views of a main portion of the control apparatus of the device of FIGS. 12 and 13 illustrated in different, successive operational positions.

FIG. 16A illustrates the position of the apparatus in which the releasing operation terminates and a winding operation begins, similar to that of FIG. 12. In this position, the restriction lever 362 is disengaged from aperture frame 120, so that the aperture frame will separate from film F under the assistance or bias of spring 322, and so that intermediate gear 338 will mesh with sprocket drive gear 346.

Figure 16B:
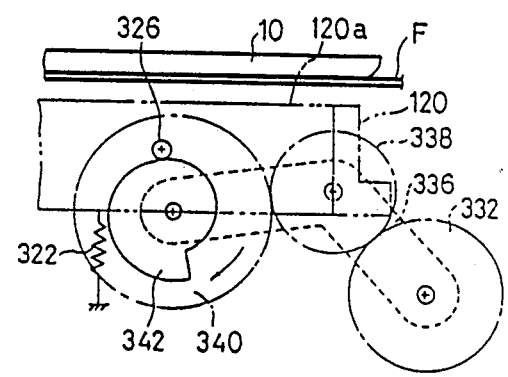

When the winding operation is initiated, pinion gear 330 will rotate in a counterclockwise direction, such that planetary gear 340 will rotate in a clockwise direction, and, accordingly, charging cam 342, which is integrally attached to planetary gear 340, will rotate in the same direction. Rotation of charging cam 342 will cause charging pin 326, which bears against the cam surface of charging cam 342, to move upwardly as shown in FIG. 16A, so as to move aperture frame 120 towards film F and against spring 322, as shown in FIG. 16B.

Figure 16C:
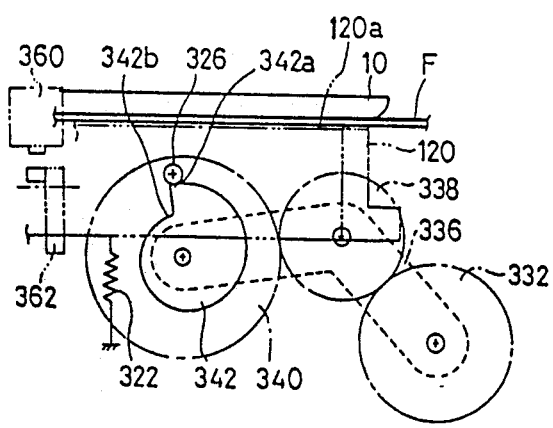

Further rotation of charging cam 342 will cause charging pin 326 to move into abutment with the largest cam lobe portion 342a of charging cam 342, so that aperture frame 120 will closely approach film F. As a result, hook 362a of restriction lever 362, which is biased by spring 364 in a counterclockwise direction as shown in FIG. 14, will come into engagement with aperture frame 120 in order to prevent the aperture frame from moving away from film F (under the bias of spring 322), as shown in FIG. 16C.

Figure 16D:
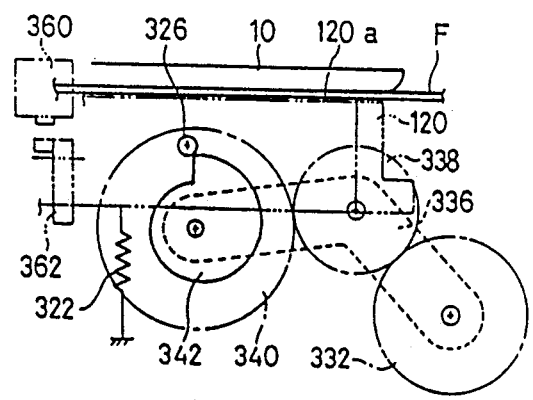

From rotation of charging cam 342 causes the largest cam lobe portion to move away from charging pin 326 so that the smallest diameter portion 342b of the charging cam which is connected to the largest cam lobe portion 342a via a stepped portion will be positioned oppositely from charging pin 326, as shown in FIG. 16D. This will result in completion of the winding operation of film F. In this position, charging pin 326 cannot move to the smallest diameter portion 342b of the charging cam 342, insofar as aperture frame 120 is retained in a position in which the aperture frame is closely adjacent to film F, as a result of the action of restriction lever 362 which bears against aperture frame 120.

When a releasing operation is effected, i.e., when the apparatus is in the position illustrated in FIG. 16D, electromagnet 360 will be energized when the releasing operation is completed in order to attract attractive piece 362b of restriction lever 362 and in order to separate hook 362a from apperture frame 120. As a result of this movement, aperture frame 120 is released from restriction lever 362, and, accordingly, the aperture frame will quickly move into a position in which it contacts stop 324 under the force of spring 322. Specifically, the aperture frame will move further away from film F and move into the position illustrated in FIG. 16A. After this movement, the previous operations will be repeated.

When the end of the film is detected by a sensor (not shown), the rewinding operation will begin. The motor will reverse to rotate the pinion gear in the clockwise direction, so that planetary gear 332 will rotate in the counterclockwise direction. Simultaneously, switching lever 336 will rotate in a counterclockwise direction in order to separate intermediate gear 338 from sprocket drive gear 344, so that the planet gear 330 will mesh with first rewinding gear 350. As a result of this meshing, rotation of pinion gear 330 will be transmitted to rewinding gear 356, and the rewinding shaft will rotate in order to rewind film F.

Normally, the rewinding operation begins by performing one frame winding operation, during which time aperture frame 120 moves away from film F and charging cam 342 moves away from charging pin 326 in response to rotation of switching lever 336, prior to establishing engagement between planetary gear 340 and first rewinding gear 350. Accordingly, no rewinding of the film occurs during periods when aperture frame 120 is spaced closely with respect to film F.

It is possible that the operation will be switched to a rewinding operation immediately prior to completion of the winding operation, when restriction lever 362 restricts the motion of aperture frame 120, as illustrated in FIG. 16C. In such case, possible damage to the film is avoided by activating electromagnet 360 to further space aperture frame 120 from film F in accordance with rotation of switching lever 336.

Further, in the fourth embodiment, it is possible to move only right and left edge portions of the aperture frame, which are formed as independent elements, separately from the remaining portion of the aperture frame, as in the second and third embodiments of the invention, independently away from and towards film F. This could be done in any case in which the vertical size of the film plane is restricted by the inner rails.

In an alternate embodiment of the present invention, which is illustrated in FIGS. 20-23, film is charged into a patrone chamber 511 and is wound by a winding spool 513 in a winding spool chamber 512.

Figure 20:
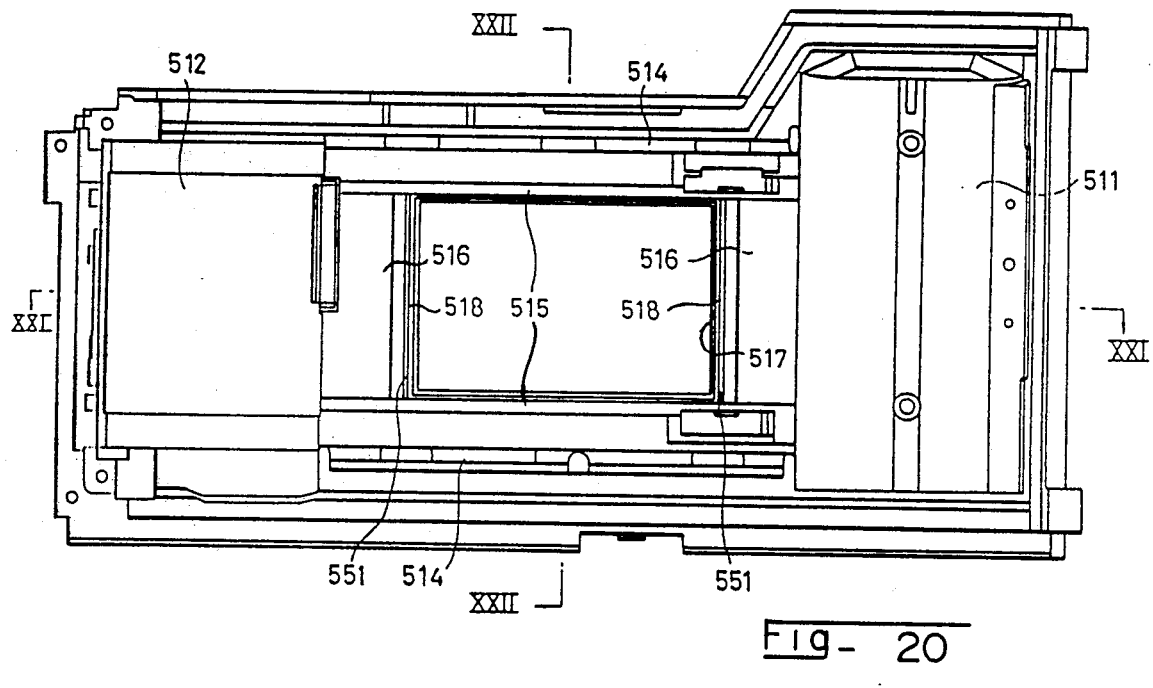
FIG. 20 is a rear view of a die cast camera body formed in accordance with an alternate embodiment of the invention.
Figure 21:
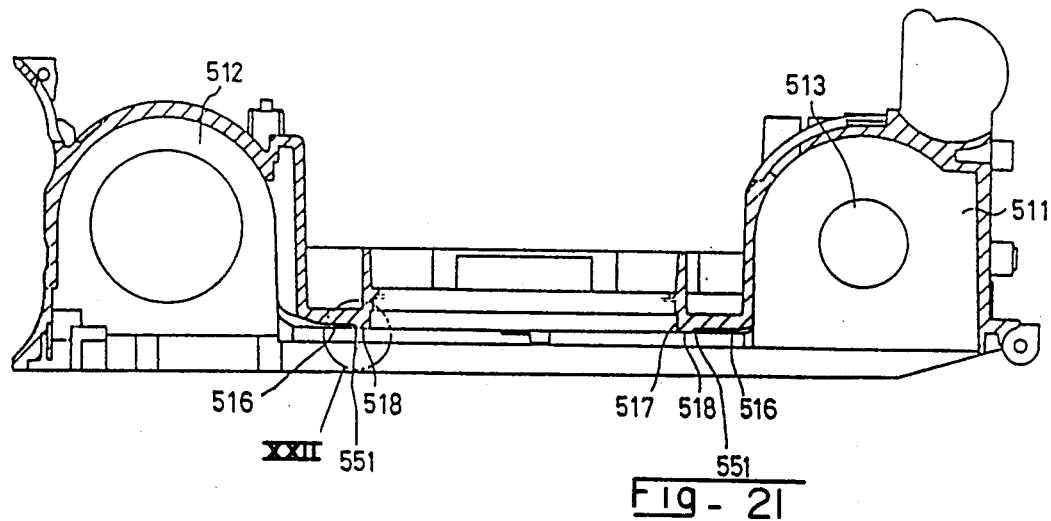
FIG. 21 is a sectional view of the die cast camera body taken along line XXI—XXI of FIG. 20.
Figure 22:
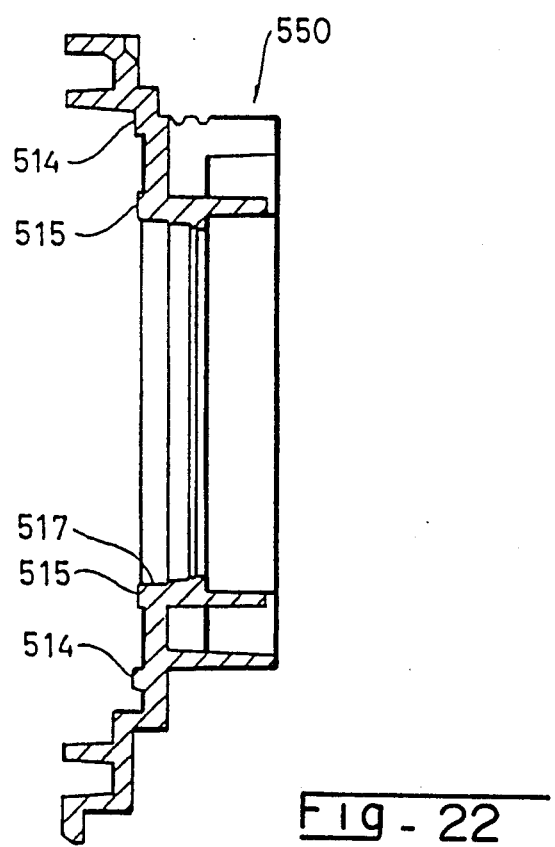
FIG. 22 is a sectional view taken along line XXII—XXII of FIG. 20.

Between patrone chamber 511 and film winding spool chamber 512 are provided respective pairs of upper and lower outer rails 514 and inner rails 515, respectively, having the front elevational shapes which are illustrated in FIG. 20. Specifically, outer rails 514 are adapted to contact a pressure plate (not illustrated in FIG. 20) on the back cover of a camera in order to restrict and define the position of outer rails 514. Inner rails 515 are adapted to abut the upper and lower edges of a front face or emulsion surface of the film. The distance between outer rails 514 and inner rails 515, as measured along the optical axis direction, is usually about 0.2 mm. As a result, a tunnel-like space or gap is formed between the inner rails and the pressure plate. The film is adapted to move in the tunnel-like space created between the pressure plate and rails 514 and 515. Upper and lower inner rails 515 define between them a film defining plane 516 which is provided, along its center, with an apertUre 517 which serves to determine the image plane size.

Figure 23:
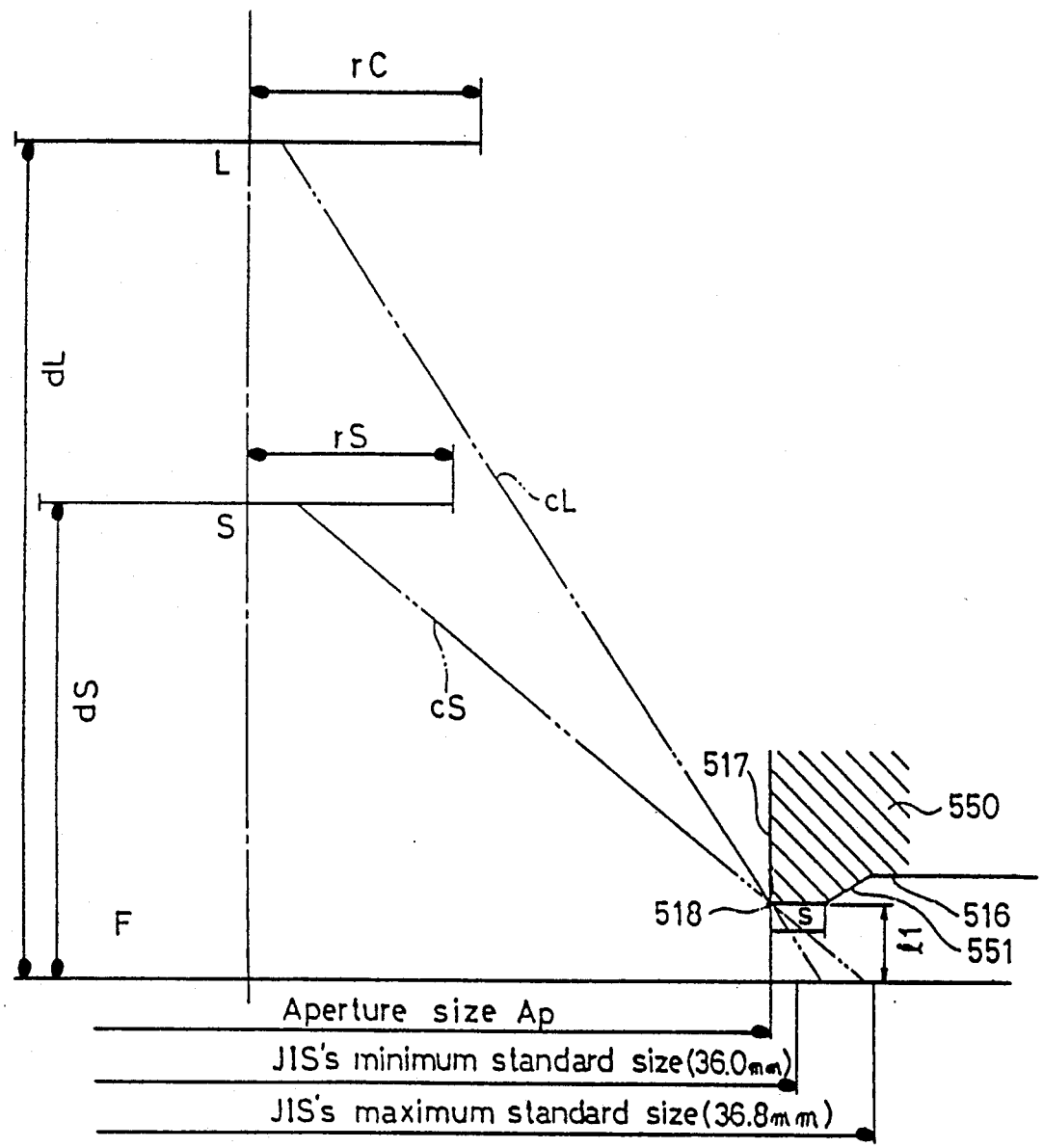
FIG. 23 is an enlarged view of the image plane of a camera illustrating the operation of the image plane size control device of FIGS. 20–22.

According to one main feature of this embodiment, the right and left-hand peripheral edge portions of the aperture frame which defines aperture 517 are inclined so as to project towards inner rails 515. FIG. 23 illustrates an enlarged view of a portion of aperture 517. Projections 518 are provided along right-hand and left-hand edges of the aperture defining plane 516 of aperture frame 550, which define aperture 517. Since projections 518 determine the image plane size along both the right and left hand sides, width(s) of the projections (see FIG. 23) 518 is as small as possible, so that there will be no substantial change in the size of the image plane. Projections 518 are smoothly and continuously connected to aperture defining plane 516 via inclined surfaces 551. The projecting length of projections 518 from aperture defining plane 516 can be determined in accordance with the position and size of the exit pupil when the zoom lens system moves into its rearmost position. The projecting length of projections 518 towards inner rails 515 will now be illustrated by way of a specific example.

In FIG. 23, the position or positions of the exit pupil when the zoom lens system comes closest to the film, and when the lens system is moved farthest away from the film, respectively, have been assumed to be represented by S (closest) and L (farthest), respectively. The actual sizes of the image plane when the exit pupil is located at the positions S and L are defined by rays of light cS and cL, respectively. The radii of the exit pupil at positions S and L are rS and rL, respectively.

The value of the distance 11 between the projections 518 and film F is determined in accordance with the distance dS or dL and between the film F and position S or position L, radius rS or rL of the exit pupil, and aperture size Ap, in order to satisfy the requirement of the JIS.

As one example, when dS=20.2 mm, dL=49.25 mm, rS=0.79 mm, rL=3.6 mm, and Ap=35.9−36.0 mm, the distance 11 will be calculated as follows: 11=0.44−0.14 mm. In view of the irregularity of the dimensions of the portions of die cast camera bodies, influences on the emulsion layers of film, and the irregularity in lens systems, if Ap=35.9 mm and 11=0.35 mm, the sizes of the image plane at positions S and L will be 36.52 mm and 36.16 mm, respectively. These values will be within the standard values of the JIS.

When the values mentioned above are selected, e.g., the 35 mm film (which usually has a thickness of 0.12−0.16 mm) which has the relatively large resilient characteristics discussed above when the film has directly emerged from patrone chamber 511 and is moving into the relatively larger space or gap between inner rails 515 and aperture defining plate 516, there will accordingly be no possibility that the film will contact aperture defining plane 516. On the other hand, when the film closely approaches aperture 517, the flatness of the film will be increased by outer rails 14, e.g., by their engagement with the pressure plate, and by inner rails 515. The film will pass through the narrow space or gap between inner rails 515 and projections 518, while maintaining the film in a relatively largely flat position. This will prevent the emulsion layer of the film from contacting projections 218; and since this ensures that the film is in an area a to projections 518 (i.e., near the periphery of aperture 517), the image plane size along the right and left-hand directions will become stabilized, regardless of the position of the exit pupil of the lens system.

As should be understood from the foregoing discussion, in accordance with the present invention, even when the exit pupil approaches the rearmost position, the image plane size along the left and right-hand directions should be maintainable within a predetermined standard.

Industrial Applicability

The apparatus of the present invention can be applied to any camera having a zoom lens in which the image plane size can be varied in accordance with the positional displacement of an exit pupil of the lens in order to restrict the image plane size within predetermined limits, and in order to take a properly sized photograph; the embodiments of the invention need not necessarily be used with a zoom lens, however.

It is obvious to those of ordinary skill in the art that the above embodiments have been described as specific representative examples of the present invention, and that other features and embodiments within the scope of the claims would be within the skill of those of ordinary skill in the art to which this invention pertains.

What is claimed is:

1. An apparatus for controlling the size of an image plane in a camera having a zoom lens, said zoom lens comprising means for displacing an exit pupil of the lens in accordance with a zooming operation of said lens, said apparatus comprising first and second movable aperture frames together forming an aperture which comprises means for defining the size of said image plane, said first and second movable aperture frames being movable in directions substantially parallel to the direction of movement of film which is travelling within said camera, said movable aperture frames being movable in response to movement of said exit pupil during a zooming operation, said movable aperture frames thereby comprising means for restricting the size of said image plane within predetermined limits.

2. Apparatus for controlling the size of an image plane in a camera, said camera having a body and an imaging lens therein, said apparatus comprising at least one aperture frame comprising means for defining the boundaries of said image plane, said at least one aperture frame being movable in a direction along the optical axis of said imaging lens, said apparatus further comprising actuating means for moving each said aperture frame towards and away from film positioned within said camera, which film is adapted to move along a path adjacent to each said aperture frame, said actuating means being operatively attached to a film winding and rewinding mechanism positioned within said camera body and thereby comprising means, when a film winding operation is completed, for moving each said aperture frame into a position in which said frame is closely adjacent to said film, and, during film winding and rewinding operations, respectively, means for moving each said frame into a position away from said film.

3. Apparatus for controlling the image plane size in a camera having a body and an imaging lens, said apparatus comprising at least one aperture frame which comprises means for defining the size of said image plane, and means for moving said at least one aperture frame in a direction along an optical axis of said imaging lens, said apparatus further comprising means for biasing said at least one aperture frame into a position closely adjacent to film moving along a path adjacent to said aperture frame, and electromagnetic actuating means for spacing said at least one aperture frame away from said film against the force exerted by said biasing means during film winding and rewinding operations.

4. Apparatus for controlling the size of the image plane in a camera having an imaging lens, said apparatus comprising at least one aperture frame defining said image plane, each said aperture frame being movable in a direction along an optical axis of said imaging lens, means for biasing said at least one aperture frame away from film moving along a path adjacent to said at least one aperture frame, actuating means for moving said at least one aperture frame into a position closely adjacent to said film against the force exerted by said biasing means, and means for limiting the movement of said at least one aperture frame towards said film, said actuating means and said limiting means being operatively connected, respectively, to a film winding and rewinding assembly in said camera, wherein when said film winding operation is completed, each said aperture frame will be maintained in a position in which each said aperture frame is located closely adjacent to said film, and wherein each said aperture frame is moved away from said film during film winding and rewinding operations.

5. A camera having a body which is adapted to receive film moving along a predetermined path through said camera body, a zoom lens and means for causing said zoom lens to perform a zooming operation, said camera comprising at least one movable aperture frame which comprises means for defining the size of an image plane on said film in accordance with said zooming operation.

6. A camera in accordance with claim 5, wherein said camera includes two aperture frames and means for moving said two frames in opposite directions substantially parallel to the direction of movement of film along said path within said body.

7. A camera in accordance with claim 6, wherein sa id frames are positioned in front of said film path when said film is placed in said camera.

8. A camera in accordance with claim 6, wherein each of said frames is substantially L-shaped, each frame including a vertical portion and a substantially horizontal lateral plate portion attached thereto.

9. A camera in accordance with claim 8, wherein each lateral plate portion comprises a rack, with said racks facing each other in spaced relation.

10. A camera in accordance with claim 9, further comprising a single common pinion engaging both of said racks.

11. A camera in accordance with claim 8, wherein said lateral plate portion on one of said frames has a projection extending forwardly from said frame.

12. A camera in accordance with claim 8, further comprising a generally L-shaped drive arm positioned forwardly of said frames, between a camera lens and said film path, said arm being pivotably attached to said camera via a stationary shaft, said arm having an upper fork-shaped portion with a generally U-shaped recess adapted to engage a projection on one of said frames.

13. A camera in accordance with claim 12, wherein a lower end of said drive arm includes a cam follower, said cam follower comprising means for abutting a camming surface on a cam ring of a rotatable zoom lens, said camming surface and said cam follower comprising means for pivoting said drive arm in response to rotation of a cam ring forming part of said lens, wherein said drive arm, when pivoted, comprises means for moving said two frames.

14. A camera in accordance with claim 6, wherein said frames are movable in response to movement of said zoom lens.

15. A camera in accordance with claim 14, wherein said zoom lens is rotatably driven by a motor which drives a rotatable gear, said lens having a sector gear thereon which is adapted to engage said rotatable gear so as to be rotatably driven by said motor.

16. A camera in accordance with claim 14, wherein said lens has a tapered camming surface positioned on a rear peripheral portion of a cam ring forming part of said lens.

17. A camera in accordance with claim 16, further comprising a drive arm which is pivotably attached to a stationary camera shaft, said arm having a cam follower along a lower portion thereof which contacts said camming surface, said drive arm further comprising an upper, substantially Y-shaped recessed portion.

18. A camera in accordance with claim 17, wherein one of said frames includes a forwardly projecting pin positioned within said Y-shaped recessed portion, wherein each of said frames includes a substantially horizontal portion and a substantially vertical portion, said pin being connected to one of said horizontal portions.

19. A camera in accordance with claim 18, wherein each of said horizontal portions includes a toothed rack.

20. A camera in accordance with claim 19, further comprising a single pinion engaging both of said racks and comprising means for driving said frames over equal distances in opposite directions when said drive arm pivots in response to movement of said cam ring on said zoom lens.

21. A camera in accordance with claim 17, wherein said drive arm is biased by a spring, said spring comprising means for continuously biasing said cam follower against said camming surface.

22. A camera in accordance with claim 6, said camera further comprising pairs of upper and lower inner rails, wherein said inner rails, together with said frames, define said image plane size, wherein said inner rails comprise means for selectively approaching said film, said rails being positioned forwardly of said film and rearwardly of said aperture frames.

23. A camera in accordance with claim 22, further comprising a pressure plate located rearwardly of said film path, said plate being biased towards said inner rails by a spring attached to said camera body, wherein a portion of said film path is defined between said rails and said plate.

24. A camera in accordance with claim 6, wherein said zoom lens controls the position of the exit pupil of the camera, and means for moving said frames in response to movement of said zoom lens to adjustably define the size of said image plane.

25. A camera in accordance with claim 5, further comprising means for maintaining the film plane substantially flat.

26. A camera in accordance with claim 25, wherein said flat film plane maintenance means comprises said at least one movable frame and means for moving said frame substantially along the optical axis of a lens of said camera.

27. A camera in accordance with claim 26, wherein said frame moving means is attached to a film winding and rewinding mechanism.

28. A camera in accordance with claim 26, comprising a spring for normally biasing said frame towards said film plane.

29. A camera in accordance with claim 28, further comprising an electromagnetic actuating assembly comprising means for moving said frame away from said film, against the biasing force of said spring, during film winding and rewinding operations.

30. A camera in accordance with claim 26, further comprising means for moving said frames closer to said film when said film is not being wound or unwound, and means for spacing the aperture frame away from the film during winding and unwinding of the film.

31. A camera in accordance with claim 26, wherein said frame is generally rectangular and has a flat surface facing said film and a central aperture of a size which is substantially equal to a predetermined standard image plane size.

32. A camera in accordance with claim 26, further comprising a spring biased pressure plate positioned rearwardly of the film.

33. A camera in accordance with claim 26, wherein said frame includes a lower portion with first and second guide plates, each of said guide plates having a slot positioned generally perpendicularly with respect to said film path.

34. A camera in accordance with claim 33, said camera body including inwardly extending guide pins, wherein respective guide plate slots ride on respective guide pins.

35. A camera in accordance with claim 33, wherein said frame includes a flat surface substantially parallel to said film plane.

36. A camera in accordance with claim 33, further comprising at least one spring attached to each of said guide plates, said springs comprising means for continuously biasing said frame towards said film.

37. A camera in accordance with claim 36, wherein said springs attached to said guide plates exert a tensile force which is less than the biasing force of a compression spring which presses said pressure plate against said film.

38. A camera in accordance with claim 36, further comprising at least one iron piece attached to a front end of each of said guide plates.

39. A camera in accordance with claim 38, further comprising electromagnets in said camera body which are disposed oppositely from each of said guide plates, said electromagnets being energizable to selectively attract said pieces and to move each said aperture frame away from said film against the biasing force of said springs attached to said guide plates.

40. A camera in accordance with claim 39, further comprising a film winding motor and a release button for selectively actuating said film winding motor and said electromagnets.

41. A camera in accordance with claim 26, wherein said moving means comprises mechanical actuating means.

42. A camera in accordance with claim 41, wherein said frame is generally rectangular and has first and second lower front edges comprising flanges.

43. A camera in accordance with claim 42, wherein said camera body includes complementarily shaped stepped portions which are parallel to said flanges and which comprise stops for limiting motion of each aperture frame towards said film plane.

44. A camera in accordance with claim 41, wherein each said frame includes a flat surface oppositely disposed to said film and an aperture of a size corresponding to a predetermined standard image plane size.

45. A camera in accordance with claim 41, wherein said frame includes a front surface, said camera further comprising an aperture frame actuating plate resiliently attached to, and normally spaced from, said front frame surface by at least two spaced springs, and means for driving said actuating plate into engagement with said front frame surface against the force exerted by said springs.

46. A camera in accordance with claim 45, wherein said actuating plate includes an elongated slot extending in a direction substantially perpendicular to said optical axis.

47. A camera in accordance with claim 46, further comprising a film winding and rewinding assembly having an eccentric driving pin engaged in said elongated slot.

48. A camera in accordance with claim 47, wherein said film winding and rewinding assembly comprises a rotatable pinion gear adapted to be driven by a drive motor, said pinion gear meshing with a double gear supported by said camera body.

49. A camera in accordance with claim 48, wherein said double gear comprises a first complete gear with teeth around its entire periphery and a second, partial gear with teeth located along only a portion of its outer periphery.

50. A camera in accordance with claim 49, further comprising a switching lever mounted coaxially with said double gear and rotatable with respect to said double gear to therefore comprise means for switching said camera from film winding to film rewinding operations, said lever including a free end attached to a planetary gear which is rotatably supported by said lever.

51. A camera in accordance with claim 49, further comprising a spool gear which is adapted to engage said partial gear, thereby comprising means for winding said film, said spool gear being meshed, via an internal gear, with a sprocket driving gear having sprockets thereon.

52. A camera in accordance with claim 51, wherein said double gear comprises means for winding said film by one frame when said double gear is wound over one rotation.

53. A camera in accordance with claim 50, wherein said planetary gear selectively meshes with one of an aperture frame driving gear or a first film rewinding gear in response to swinging motion of said lever.

54. A camera in accordance with claim 53, wherein said driving pin is mounted on an aperture frame driving gear.

55. A camera in accordance with claim 26, wherein said moving means comprises an electromagnetic actuator assembly and a mechanical actuating assembly.

56. A camera in accordance with claim 55, wherein said frame is generally rectangular and is biased away from said film by at least one spring attached to said camera body and to said frame.

57. A camera in accordance with claim 56, further comprising at least one stop for limiting motion of said frame away from said film path.

58. A camera in accordance with claim 55, wherein said frame further comprises a charging pin adapted to bear against a rotatable cam.

59. A camera in accordance with claim 58, wherein said mechanical actuating assembly includes a first shaft rotatably driven by a motor, a pinion gear being attached to said shaft and meshing with a first planetary gear rotatably positioned on an additional shaft which is attached to said camera body.

60. A camera in accordance with claim 59, wherein a generally V-shaped switching lever is attached at one end to said additional shaft.

61. A camera in accordance with claim 60, wherein an intermediate gear is attached, via a common shaft, to an intermediate portion of said lever, wherein said lever is engaged with said first planetary gear, and a second planetary gear is attached to a second end of said lever, said lever being adapted to swing in both clockwise and counterclockwise directions.

62. A camera in accordance with claim 61, further comprising a sprocket drive gear whose sprockets engage with teeth on said intermediate gear, said cam being integrally attached to said second planetary gear, said cam being curved, wherein said pinion gear engages a spool gear.

63. A camera in accordance with claim 62, further comprising a first rewinding gear which is adapted to selectively engage said second planetary gear, and a second rewinding gear having a first rewinding shaft which is integrally attached thereto.

64. A camera in accordance with claim 55, further comprising at least one restricting lever which is pivotably attached to the bottom of said camera body and which comprises means for maintaining said frame closely adjacent to said film, each said lever having a hook at one end and an attractive portion at a second, rear end.

65. A camera in accordance with claim 64, further comprising an electromagnet oppositely disposed from each said portion, wherein each said lever is continuously biased by a spring to force each said hook into abutment with a front face of said frame, wherein said electromagnet, when activated, comprises means for rotating each said restriction lever against the bias of each said lever-biasing spring.

66. A camera having a body which is adapted to receive film moving along a predetermined path through said camera body, a lens cooperating with said camera to photograph an image and means for adjusting the focal length of said lens, said camera comprising at least one movable aperture frame which comprises means for defining the size of the image on said film in accordance with the focal length of said lens.

* * * * *

UNITED STATES PATENT AND TRADEMARK OFFICE
CERTIFICATE OF CORRECTION

PATENT NO. : 5,010,357

DATED : April 23, 1991

INVENTOR(S) : Masayuri MISAWA

It is certified that error appears in the above-indentified patent and that said Letters Patent is hereby corrected as shown below:

FOREIGN PATENT DOCUMENTS:

On the cover, insert "454134 9/1936 Great Britain".
On the cover, insert "306819 2/1929 Great Britain".
On the cover, insert "2247104 6/1941 Takacs 354/159".
On the cover, insert "2233239 2/1941 Baumgartner 354/159".
On the cover, insert "2295801 9/1942 Nagel 354/159".
At column 1, line 21, change "-" to ---~---.
At column 1, line 22, change "-" to ---~---.
At column 9, line 12, delete "," after "4".
At column 17, line 23, change "bas" to ---bias---.
At column 18, line 9, change "From" to ---Further---.
At column 19, line 28, change "apert Ure" to ---aperture---.
At column 19, line 67, change "-" to ---~---.
At column 20, line 1, change "-" to ---~---.
At column 20, line 10, change "-" to ---~---.
At column 20, line 25, change "a" to ---adjacent---.
At column 21, line 66, claim 7, line 1, change "sa id" to ---said---.

Signed and Sealed this

Twenty-first Day of November, 1995

Attest:

BRUCE LEHMAN

*Attesting Officer*   *Commissioner of Patents and Trademarks*